US011010866B2

(12) United States Patent
Eric et al.

(10) Patent No.: US 11,010,866 B2
(45) Date of Patent: May 18, 2021

(54) CIRCUIT DEVICE, ELECTRONIC APPARATUS, AND MOBILE BODY

(71) Applicant: Seiko Epson Corporation, Tokyo (JP)

(72) Inventors: Jeffrey Eric, Richmond (CA); Kumar Anandabairavasamy Anand, Richmond (CA); Yasutoshi Akiba, Chino (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/860,142

(22) Filed: Apr. 28, 2020

(65) Prior Publication Data

US 2020/0342567 A1 Oct. 29, 2020

Related U.S. Application Data

(60) Provisional application No. 62/839,849, filed on Apr. 29, 2019.

(30) Foreign Application Priority Data

Oct. 29, 2019 (JP) .............................. JP2019-195845

(51) Int. Cl.
*G06T 3/00* (2006.01)
*G06T 3/60* (2006.01)

(52) U.S. Cl.
CPC .............. *G06T 3/005* (2013.01); *G06T 3/606* (2013.01)

(58) Field of Classification Search
CPC .... B60K 37/00; G02B 27/01; G06T 2200/28; G06T 3/005; G06T 3/0093; G06T 3/606
See application file for complete search history.

(56) References Cited

U.S. PATENT DOCUMENTS

| 8,134,566 | B1* | 3/2012 | Brown | ..................... G06T 15/04 |
| | | | | 345/522 |
| 2007/0279434 | A1* | 12/2007 | Fujita | ...................... G06T 15/04 |
| | | | | 345/611 |
| 2008/0062164 | A1 | 3/2008 | Bassi et al. | |
| 2010/0027911 | A1* | 2/2010 | Lefebvre | ................... G06T 7/35 |
| | | | | 382/294 |

(Continued)

FOREIGN PATENT DOCUMENTS

| JP | 2010-164869 A | 7/2010 |
| JP | 2014-157324 A | 8/2014 |

(Continued)

*Primary Examiner* — Ming Wu
(74) *Attorney, Agent, or Firm* — Harness, Dickey & Pierce, P.L.C.

(57) ABSTRACT

A circuit device (100) includes a coordinate transform circuit (20) and a mapping processing circuit (30). The coordinate transform circuit (20) performs coordinate transformation from an input coordinate (IXY1) to an output coordinate (QXY1). The mapping processing circuit (30) generates a second image (IMG2) to be displayed in a display panel for displaying an image in a curved screen display by performing mapping processing on a first image (IMG1) that is input based on the output coordinate (QXY1). The coordinate transform circuit (20) performs the coordinate transformation from the input coordinate (IXY1) to the output coordinate (QXY1) by performing computation processing using a second or more order polynomial representing the coordinate transformation.

14 Claims, 16 Drawing Sheets

(56) References Cited

U.S. PATENT DOCUMENTS

| | | | |
|---|---|---|---|
| 2013/0141593 A1 | 6/2013 | Bassi et al. | |
| 2014/0125781 A1* | 5/2014 | Hirai | H04N 13/366 348/51 |
| 2015/0097858 A1 | 4/2015 | Miki et al. | |
| 2017/0351092 A1* | 12/2017 | Nakata | B60R 16/02 |
| 2019/0087978 A1* | 3/2019 | Tourapis | G06T 9/00 |

FOREIGN PATENT DOCUMENTS

| | | |
|---|---|---|
| JP | 2014-171234 A | 9/2014 |
| JP | 2015-075516 A | 4/2015 |
| JP | 2015-087619 A | 5/2015 |

\* cited by examiner

CIRCUIT DEVICE, ELECTRONIC APPARATUS, AND MOBILE BODY

The present application is based on, and claims priority from U.S. Application Ser. No. 62/839,849, filed Apr. 29, 2019, and JP Application Serial Number 2019-195845, filed Oct. 29, 2019, the disclosures of which are hereby incorporated by reference herein in their entirety.

BACKGROUND

1. Technical Field

The present disclosure relates to circuit devices, electronic apparatuses, and mobile bodies.

2. Related Art

Head up displays (HUD) are known in which information is displayed in user's field of view in a superimposed manner by displaying images on a curved screen display such as a transparent screen. When the head up display displays an input image as is, the display image is viewed as being distorted due to distortion of the curved screen display. Therefore, the head up display displays an undistorted image by performing distortion correction on an input image and displaying the image subjected to the distortion correction. JP-A-2010-164869 discloses a known technology for a head up display that performs distortion correction. The head up display in JP-A-2010-164869 includes a memory for storing a coordinate transform equation, performs coordinate transformation using the coordinate transform equation, and performs distortion correction by performing mapping processing on the input image based on the transformation result.

Although a coordinate transformation equation in distortion correction is disclosed in JP-A-2010-164869, the equation is a theoretical one, and includes complex operations such as an integral and a square root. Therefore, there is a problem in the technology disclosed in JP-A-2010-164869 in that it is difficult to perform high-speed processing such as performing distortion correction on a moving image in real time, for example. JP-A-2010-164869 does not disclose specific processing for performing high-speed processing.

SUMMARY

One aspect of the disclosure relates to a circuit device including: a coordinate transform circuit configured to perform coordinate transformation from an input coordinate to an output coordinate; and a mapping processing circuit configured to generate a second image to be displayed in a display panel for displaying an image in a curved screen display by performing mapping processing, based on the output coordinate, on a first image that is input, wherein the coordinate transform circuit performs the coordinate transformation by performing computation processing using a second or more order polynomial representing the coordinate transformation.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Hereinafter, preferred embodiments of the disclosure will be described in detail. Note that the embodiments given below are not intended to unduly limit the scope of the invention recited in the appended claims. In addition, not all of the constituent elements described below are essential to the invention.

1. First Exemplary Configuration

Figure 1:
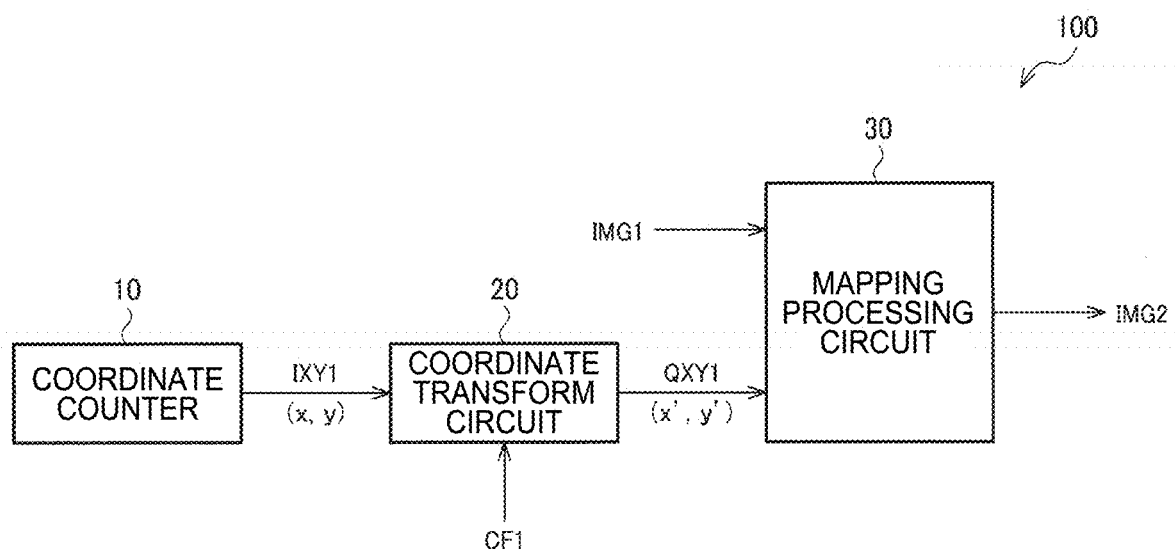
FIG. 1 shows a first exemplary configuration of a circuit device.
Figure 2:
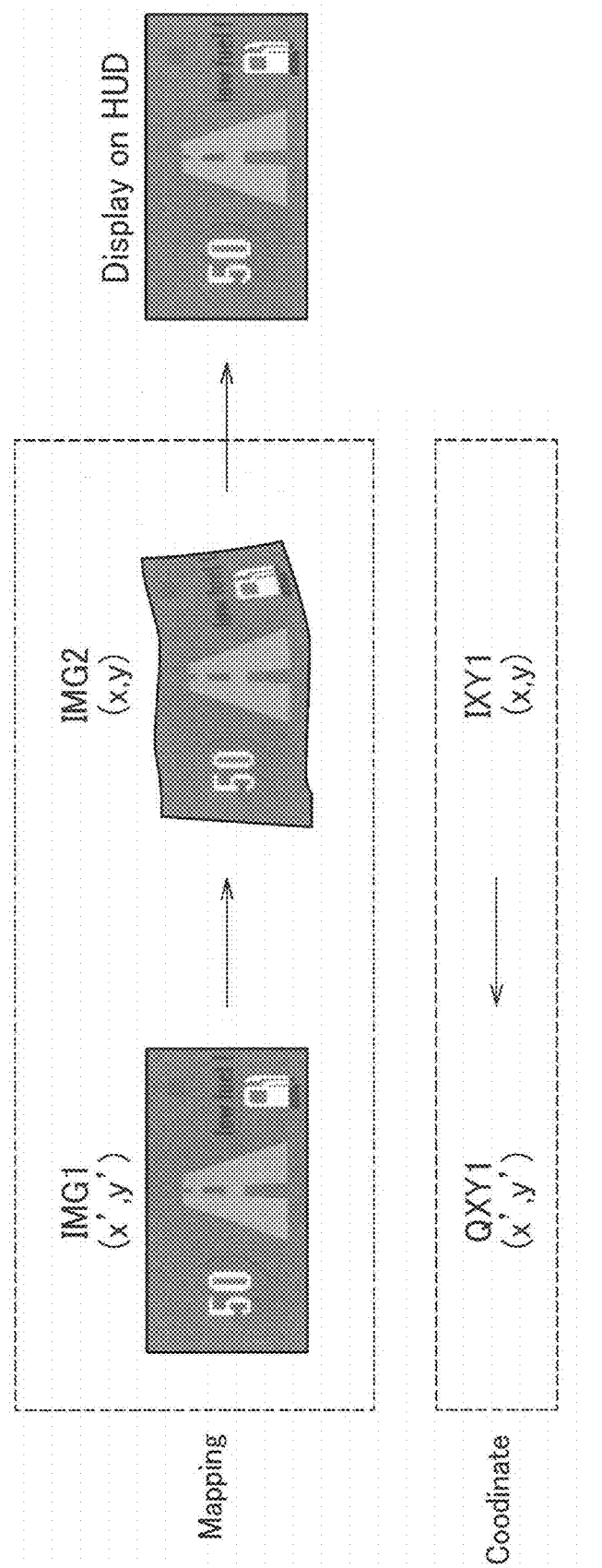
FIG. 2 is a diagram illustrating operations of the circuit device in the first exemplary configuration.

FIG. 1 shows a first exemplary configuration of a circuit device 100 of the present embodiment. FIG. 2 is a diagram illustrating operations of the circuit device 100 in the first exemplary configuration.

The circuit device 100 is an HUD controller for controlling displaying images in a head up display. Note that the circuit device 100 is not limited to the HUD controller, and may be a display driver that drives a display panel of the head up display, for example. In this case, the circuit device 100 may include a drive circuit that drives the display panel based on an image IMG2. The circuit device 100 is an integrated circuit device referred to as an IC (Integrated Circuit). The circuit device 100 is an IC manufactured by a semiconductor process, and is a semiconductor chip in which circuit elements are formed on a semiconductor substrate.

As shown in FIG. 2, the circuit device 100 performs processing for mapping an image IMG1 to an image IMG2. The image IMG1 is an input image, and is also referred to as a first image. The image IMG2 is an output image, and is also referred to as a second image. In the mapping processing, distortion for canceling the distortion due to a curved screen display of the head up display is applied to the image IMG2. That is, the image IMG2 displayed in the display panel of the head up display is a distorted image. As a result of this image IMG2 being displayed in the curved screen display, a display image that is not distorted is presented to a user.

An image processing engine that performs such image transformation in distortion correction is referred to as a warp engine. In the first exemplary configuration, a case where the circuit device 100 is an inverse warp engine will be described. The inverse warp engine is a warp engine having a function of inverse warp. The inverse warp is transformation for obtaining each pixel of an output image of the warp engine from a pixel at an arbitrary position in the input image. As shown in FIG. 2, the circuit device 100 realizes the inverse warp by transforming a coordinate (x, y) in the image IMG2, which is an output image, to a coordinate (x', y') in the image IMG1, which is an input image, and performing mapping processing based on the coordinates.

Note that, as will be described in a second exemplary configuration, the circuit device 100 may be a forward warp engine. Also, as will be described in third and fourth exemplary configurations, the circuit device 100 may further perform image rotation.

Hereinafter, the details of the first exemplary configuration in which the circuit device 100 is an inverse warp engine will be described. As shown in FIG. 1, the circuit device 100 includes a coordinate counter 10, which is a first coordinate counter, a coordinate transform circuit 20, and a mapping processing circuit 30.

The coordinate transform circuit 20 performs coordinate transformation from an input coordinate IXY1 to an output coordinate QXY1. In the first exemplary configuration, the input coordinate IXY1 is a coordinate (x, y) corresponding to a coordinate on the image IMG2, and the output coordinate QXY1 is a coordinate (x', y') corresponding to a coordinate on the image IMG1. The coordinate transform circuit 20 performs coordinate transformation from the input coordinate IXY1 to the output coordinate QXY1 by performing computation processing using a second or more order polynomial representing the coordinate transformation. The coordinate transform equation when the polynomial is a second order polynomial is shown in the following equation (1).

[Math. 1]

$$\begin{cases} x' = f(x, y) = a1 \times x^2 + a2 \times y^2 + a3 \times xy + a4 \times x + a5 \times y + a6 \\ y' = g(x, y) = b1 \times x^2 + b2 \times y^2 + b3 \times xy + b4 \times x + b5 \times y + b6 \end{cases} \quad (1)$$

In the first row of the above-equation (1), $a1 \times x^2$ on the right side is a first term of a polynomial for obtaining x'. Similarly, $a2 \times y^2$, a3×xy, a4×x, a5×y, and a6 are a second term, a third term, a fourth term, a fifth term, and a sixth term of the polynomial for obtaining x'. a1 is a coefficient of the first term, that is, a first coefficient. Similarly, a2, a3, a4, a5, and a6 are respectively a second coefficient, a third coefficient, a fourth coefficient, a fifth coefficient, and a sixth coefficient. The same applies to the equation for obtaining y'.

Note that the coordinate transform equation is not limited to the second order polynomial, and may be a third or more order polynomial. For example, a coordinate transform equation when the polynomial is a third order polynomial is shown in the following equation (2), for example.

[Math. 2]

$$\begin{cases} x' = u(x, y) = p1 \times x^3 + p2 \times y^3 + p3 \times x^2 y + p4 \times xy^2 + \\ \quad p5 \times x^2 + p6 \times y^2 + p7 \times xy + p8 \times x + p9 \times y + p10 \\ y' = v(x, y) = q1 \times x^3 + q2 \times y^3 + q3 \times x^2 y + q4 \times xy^2 + \\ \quad q5 \times x^2 + q6 \times y^2 + q7 \times xy + q8 \times x + q9 \times y + q10 \end{cases} \quad (2)$$

The mapping processing circuit 30 generates the image IMG2 by performing mapping processing on the image IMG1 to be input based on the output coordinate QXY1. Specifically, the pixel value at a coordinate (x, y) in the image IMG2 is obtained from a pixel value at a coordinate (x', y') in the image IMG1. (x, y) is the input coordinate IXY1, and (x', y') is the output coordinate QXY1. Note that the mapping processing circuit 30 does not use the input coordinate IXY1, and performs mapping processing using an internally generated coordinate and the output coordinate QXY1. This point will be described later with reference to FIG. 4. The pixel value is color data of display pixel at the coordinate, for example.

The image IMG2 is displayed in the curved screen display of the head up display. For example, the head up display includes a light source, a liquid crystal display panel, an optical system, and a transparent screen. The image IMG2 is displayed in the liquid crystal display panel. The light source emits light, the emitted light is transmitted through the liquid crystal display panel, and the optical system projects the transmitted light on the transparent screen, and as a result, the image IMG2 is projected on the transparent screen. In this case, the transparent screen corresponds to the curved screen display. Alternatively, the head up display includes a transparent display constituted by an organic EL display panel or the like. In this case, the image IMG2 is directly displayed in the transparent display. That is, the transparent display, which is a display panel, also acts as a curved screen display.

According to the present embodiment, as a result of the coordinate transform circuit 20 performing coordinate transformation by computation processing using a polynomial, high-speed processing for distortion correction is possible. Specifically, as shown in the above-equation (1), the polynomial is formed by a combination of multiplications and additions, and does not include complex calculations such as an integral. Therefore, as a result of using the polynomial, the computation time can be reduced compared with a case where calculation including an integral and the like is performed.

Also, in the polynomial, (x, y) indicating the input coordinate IXY1 is in one-to-one correspondence with (x', y') indicating the output coordinate QXY1. This correspondence can be used as is as the correspondence between pixels of the output image IMG2 and pixels of the input image IMG1 in the mapping processing. That is, when (x, y) is successively input to the coordinate transform circuit 20 pixel by pixel, (x', y') is successively output pixel by pixel in correspondence therewith. As a result of the mapping processing circuit 30 performing mapping pixel by pixel using this correspondence, one screen's worth of image IMG2 can be formed. Such successive processing is suitable for real-time processing compared with a case where mapping processing is performed after creating a table or the like. Also, because pixel data is input and output by a pixel clock in display processing, the pixel-by-pixel successive processing is suitable for real-time processing.

Hereinafter, a case where the coordinate transform equation is a second order polynomial as in the above-equation (1) will be described as an example.

Coefficient information CF1 of the polynomial and an input coordinate IXY1 are input to the coordinate transform circuit 20. The coordinate transform circuit 20 obtains the output coordinate QXY1 from the input coordinate IXY1 by performing computation processing based on the coefficient information CF1. The coefficient information CF1 is information of the coefficients a1 to a6 and b1 to b6 of the above-equation (1). For example, the circuit device 100 includes a storage for storing the coefficient information CF1, and the coefficient information CF1 is input to the coordinate transform circuit 20 from the storage. The storage is a register or a memory. The memory is a semiconductor memory such as a RAM or a nonvolatile memory. The coefficient information CF1 is written into the storage when the circuit device 100 is activated or the head up display is manufactured, for example.

In the coordinate transformation using a polynomial, the correspondence between the input coordinate IXY1 and the output coordinate QXY1 is determined by the coefficients of the polynomial. That is, as a result of the coefficient information CF1 corresponding to the shape of the curved screen display being input to the coordinate transform circuit 20, distortion correction appropriate for various types of curved screen display can be realized. Also, because the coordinate transform circuit 20 obtains the output coordinate QXY1 from an input coordinate IXY1 that has been input, pixel-by-pixel coordinate transformation suitable for real-time processing can be performed, as described above.

The coordinate counter 10 outputs a first count coordinate, which is a coordinate in units of pixels based on the pixel clock. The coordinate transform circuit 20 performs coordinate transformation on the first count coordinate serving as the input coordinate IXY1. In the first exemplary configuration, since the input coordinate IXY1 correspond to a coordinate on the image IMG2, the pixel clock used when the mapping processing circuit 30 processes the image IMG2 is input to the coordinate counter 10.

The size of the image IMG2 is denoted as N×M pixels. N and M are integers of two or more. For example, the coordinate counter 10 increments, at y=0, x by one for each pixel clock, and outputs (0, 0), (1, 0), (2, 0), . . . , (N−1, 0). Next, the coordinate counter 10 sets y=1, increments x by one for each pixel clock, and outputs (0, 1), (1, 1), (2, 1), . . . , (N−1, 1). The coordinate counter 10 repeats this operation until (N−1, M−1). Note that the count sequence of the coordinates is not limited to the above, and the count sequence may be set in accordance with the sequence of processing pixels of the image IMG2.

In the present embodiment, the coordinate counter 10 outputs a coordinate (x, y) to the coordinate transform circuit 20 pixel by pixel based on the pixel clock, and the coordinate transform circuit 20 performs coordinate transformation and outputs a coordinate (x', y') pixel by pixel. With this, the mapping processing circuit 30 can perform mapping processing pixel by pixel based on the pixel clock. With this, distortion correction suitable for real-time processing can be realized.

Note that the processing time of operations for transforming the input coordinate IXY1 to the output coordinate QXY1 may be a plurality of cycles of the pixel clock. The output coordinate QXY1 corresponding to the input coordinate IXY1 is output with a delay corresponding to the processing time, but it is sufficient that one output coordinate QXY1 can be obtained in one cycle of the pixel clock as throughput.

Figure 3:
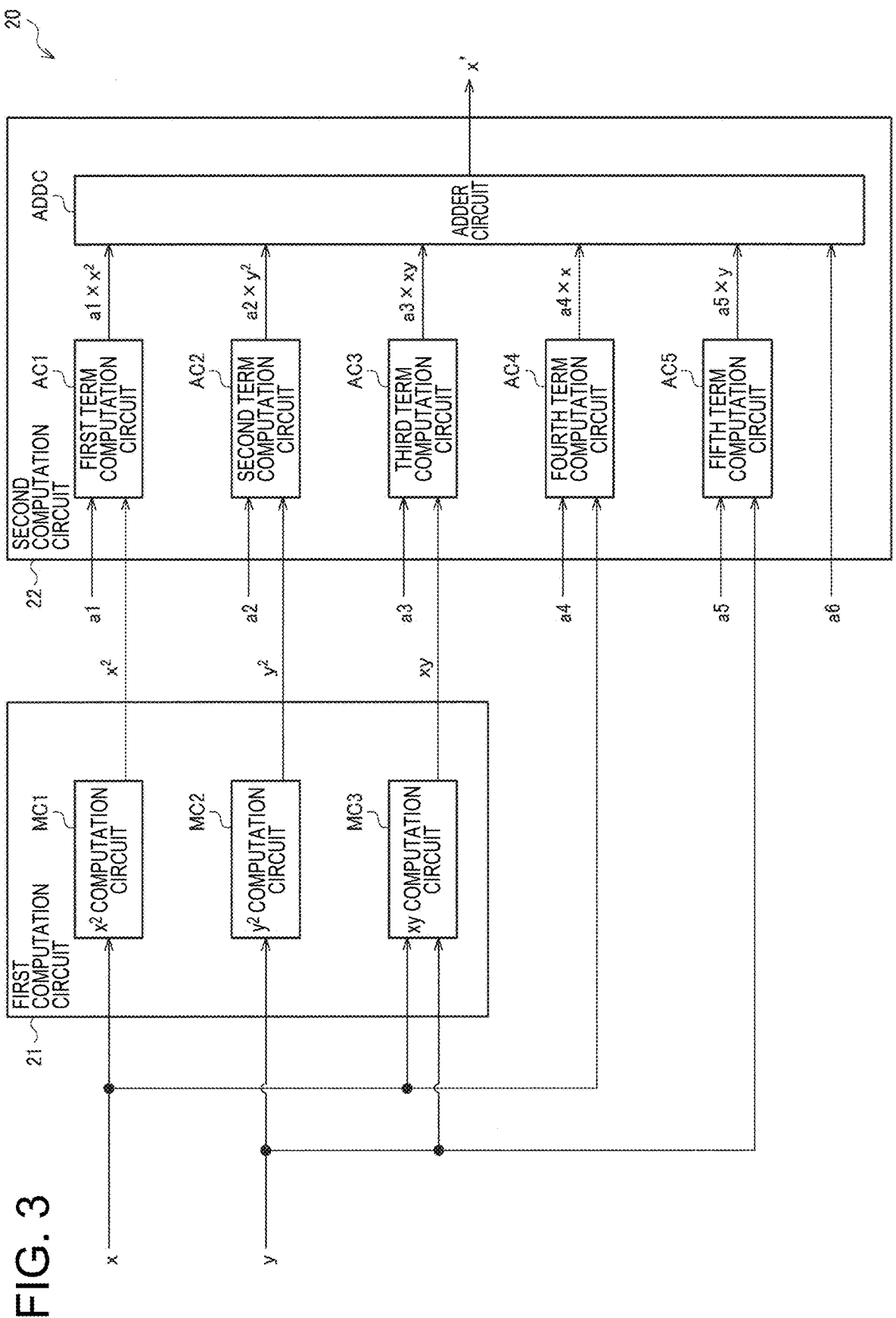
FIG. 3 shows a detailed exemplary configuration of a coordinate transform circuit.

FIG. 3 shows a detailed exemplary configuration of the coordinate transform circuit 20. The coordinate transform circuit 20 includes a first computation circuit 21 and a second computation circuit 22. The first computation circuit 21 and the second computation circuit 22 are logic circuits, and are constituted by separate hardware circuits. Note that, in FIG. 3, only the computation circuit for obtaining x' is illustrated, but the computation circuit for obtaining y' is similarly configured.

When the input coordinate IXY1 is (x, y), the first computation circuit 21 obtains $x^2$, $y^2$, and xy. Specifically, the first computation circuit 21 includes a $x^2$ computation circuit MC1 for obtaining $x^2$ by squaring x, a $y^2$ computation circuit MC2 for obtaining $y^2$ by squaring y, and an xy computation circuit MC3 for obtaining xy by multiplying x and y. The computation circuits MC1 to MC3 are separate hardware multipliers.

The second computation circuit 22 obtains the output coordinate QXY1 based on the computation result of the first computation circuit 21 and the coefficient information CF1. Here, the second computation circuit 22 obtains x' of (x', y'). The coefficients a1 to a6 of the above-equation (1) are input to the second computation circuit 22 as the coefficient information CF1. The second computation circuit 22 includes first to fifth term computation circuits AC1 to AC5 and an adder circuit ADDC. The first to fifth term computation circuits AC1 to AC5 are separate hardware multipliers.

The first term computation circuit AC1 obtains the first term $a1 \times x^2$ by multiplying the coefficient a1 and $x^2$. The second term computation circuit AC2 obtains the second term $a2 \times y^2$ by multiplying the coefficient a2 and $y^2$. The third term computation circuit AC3 obtains the third term a3×xy by multiplying the coefficient a3 and xy. The fourth term computation circuit AC4 obtains the fourth term a4×x by multiplying the coefficient a4 and x. The fifth term computation circuit AC5 obtains the fifth term a5×y by multiplying the coefficient a5 and y. The adder circuit ADDC adds the first to fifth terms and the coefficient a6, which is the sixth term, and outputs the result as x'. With this, the computation of x' in the above-equation (1) can be realized.

Note that the configuration of the first computation circuit 21 and the second computation circuit 22 is not limited to the configuration in FIG. 3. For example, the first computation circuit 21 may include three computation circuits, and the three computation circuits may perform pipeline processing so as to compute $x^2$, $y^2$, and xy. Also, the second computation circuit 22 may include five computation circuits, and the five computation circuits may perform pipeline processing so as to compute first to fifth terms.

According to the present embodiment, the first computation circuit 21 includes the computation circuits MC1 to MC3 for obtaining $x^2$, $y^2$, and xy, and the second computation circuit 22 includes the first to fifth term computation circuits AC1 to AC5 for obtaining the first to fifth terms. With this, the terms can be computed in parallel, and high-speed processing suitable for real-time processing can be realized.

Note that the second computation circuit 22 need only include first to $n^{th}$ term computation circuits. The $i^{th}$ term computation circuit computes an $i^{th}$ term of the polynomial. n is an integer of two or more, and i is an integer of one or more and n or less. If the coordinate transform equation is a second order polynomial, as shown in FIG. 3, n=5. If the coordinate transform equation is a third order polynomial, as the above-equation (2), for example, n may be nine.

Figure 4:
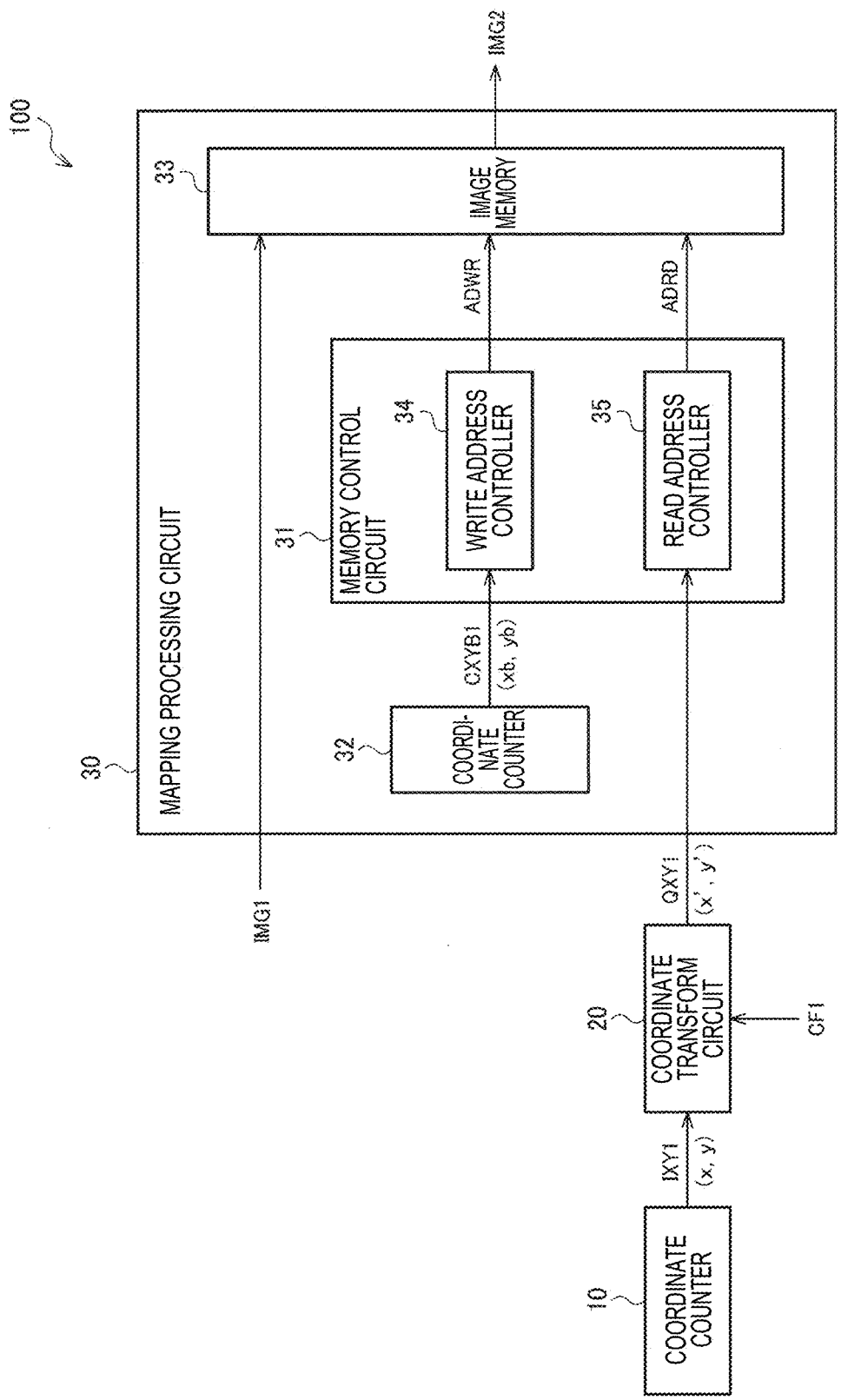
FIG. 4 shows a detailed exemplary configuration of a mapping processing circuit.

FIG. 4 shows a detailed exemplary configuration of the mapping processing circuit 30. The mapping processing circuit 30 includes a memory control circuit 31, a coordinate counter 32, which is a second coordinate counter, and an image memory 33.

The coordinate counter 32 outputs a second count coordinate CXYB1, which is a coordinate in units of pixels based on the pixel clock. The second count coordinate CXYB1 is denoted by (xb, yb). In the first exemplary configuration, since (xb, yb) designates a coordinate on the image IMG1, the pixel clock that is input to the mapping processing circuit 30 along with the image IMG1 is input to the coordinate counter 32. The coordinate counter 32 counts (xb, yb) by performing counting operation similar to that of the coordinate counter 10.

The memory control circuit 31 performs access control of the image memory 33. The image memory 33 is a buffer memory for temporarily storing the image IMG1, and is a semiconductor memory such as a RAM, for example. The memory control circuit 31 writes the image IMG1 into the image memory 33 based on the second count coordinate CXYB1, reads out a pixel value from the image memory 33 based on the output coordinate QXY1 from the coordinate transform circuit 20, and outputs the pixel value as a pixel value of the image IMG2. Specifically, the memory control circuit 31 includes a write address controller 34 and a read address controller 35.

The write address controller 34 decodes (xb, yb), which is a second count coordinate CXYB1, into the write address ADWR, and write the pixel value at (xb, yb) in the image IMG1 into the image memory 33 at the address ADWR. As a result of repeating this operation, the image IMG1 is written into the image memory 33.

The read address controller 35 reads out and decodes (x', y'), which is an output coordinate QXY1, into the address ADRD, and reads out a pixel value at the address ADRD of the image memory 33. This operation corresponds to reading out a pixel value at (x', y') of the image IMG1. The read address controller 35 outputs the read-out pixel value as a pixel value at (x, y) of the image IMG2. As a result of repeating this operation, the image IMG2 is output from the mapping processing circuit 30.

In the mapping processing described above, the pixel value at (x, y) of the image IMG2 is acquired from a pixel value at (x', y') of the image IMG1. That is, the mapping processing circuit 30 functions as the inverse warp engine illustrated in FIG. 2.

2. Second Exemplary Configuration

Figure 5:
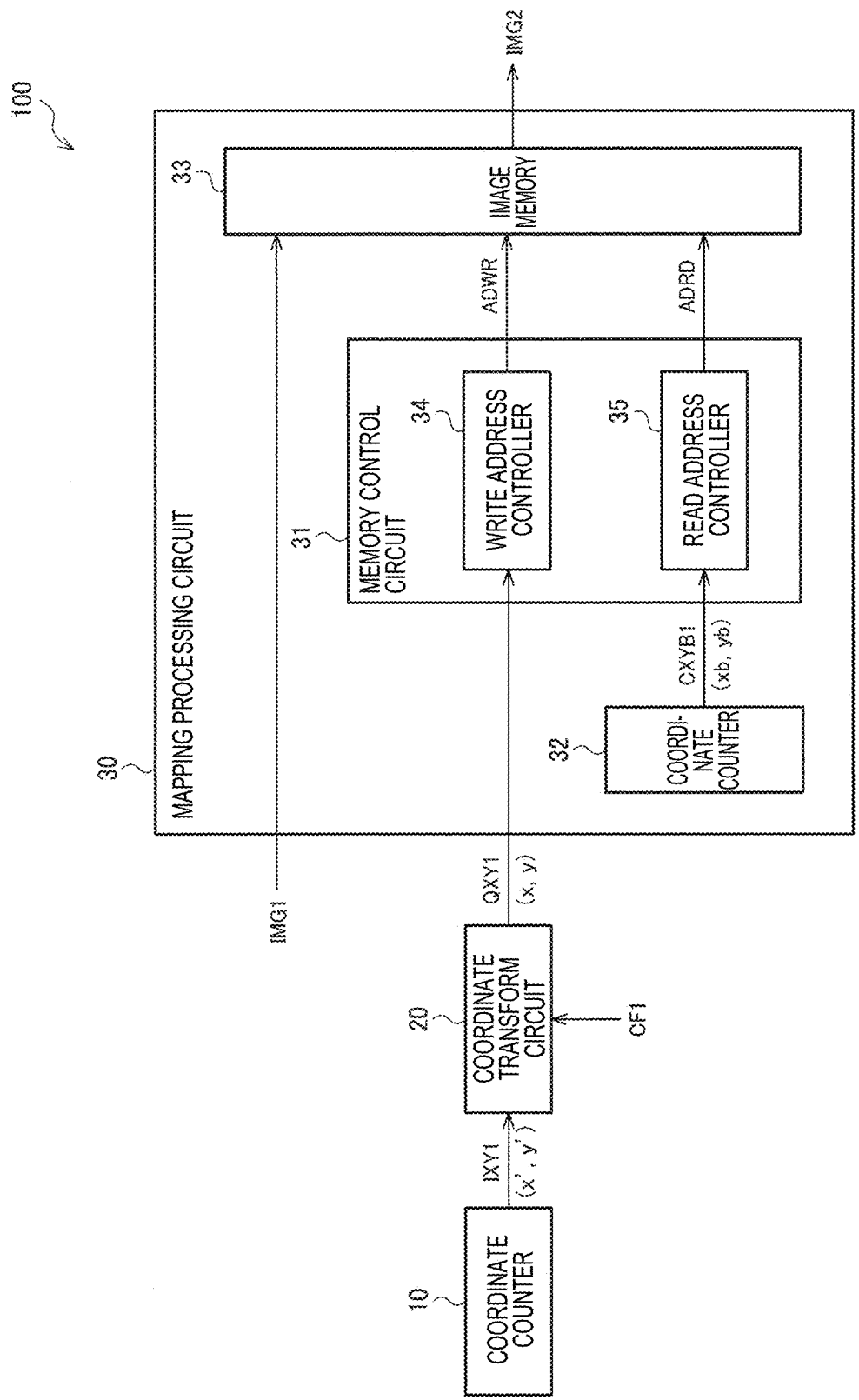
FIG. 5 shows a second exemplary configuration of the circuit device.
Figure 6:
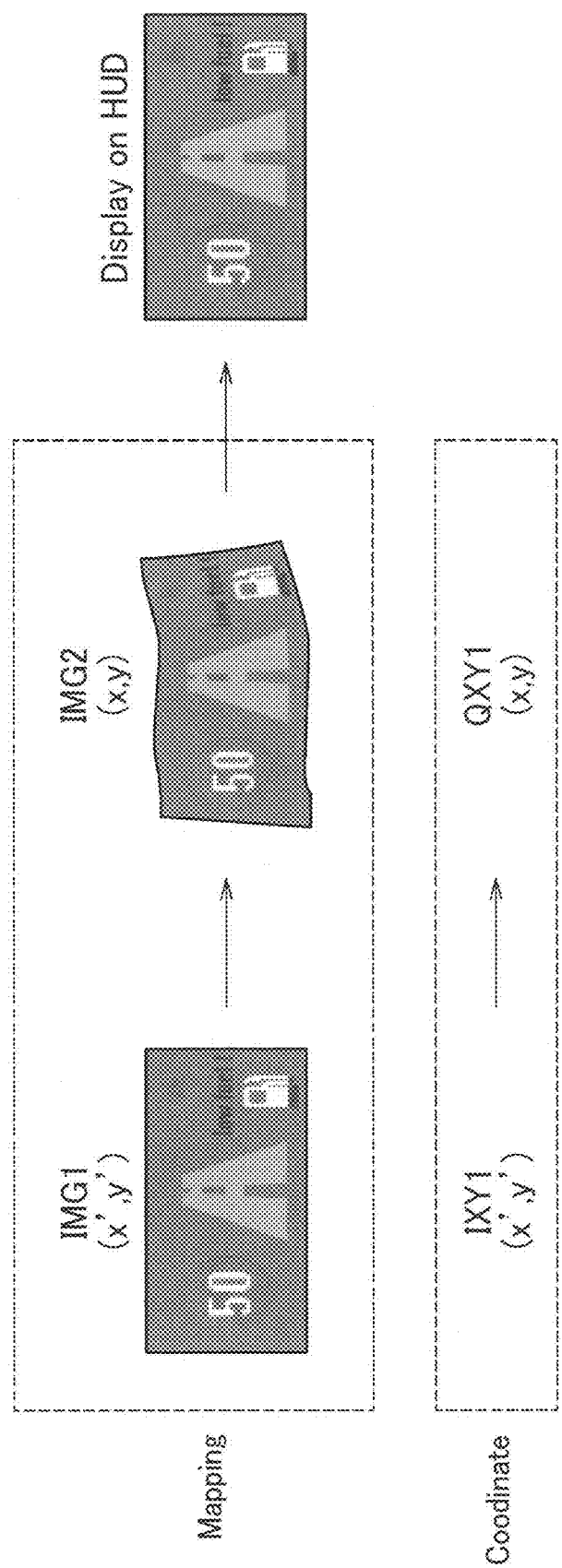
FIG. 6 is a diagram illustrating operations of the circuit device in the second exemplary configuration.

FIG. 5 shows a second exemplary configuration of the circuit device 100. FIG. 6 is a diagram illustrating operations of the circuit device 100 in the second exemplary configuration.

In the second exemplary configuration, a case where the circuit device 100 is a forward warp engine will be described. The forward warp engine is a warp engine having a function of forward warp. The forward warp is transformation for obtaining each pixel of an input image of the warp engine from a pixel at an arbitrary position in the output image. As shown in FIG. 6, the circuit device 100 realizes the forward warp by transforming a coordinate (x', y') in an image IMG1, which is an input image, to a coordinate (x, y) in an image IMG2, which is an output image, and performing mapping processing based on the coordinates.

As shown in FIG. 5, the circuit device 100 includes a coordinate counter 10, a coordinate transform circuit 20, and a mapping processing circuit 30.

In the second exemplary configuration, the coordinate counter 10 outputs (x', y'), which is the first count coordinate, to the coordinate transform circuit 20 as the input coordinate IXY1. Since (x', y') corresponds to a coordinate on the image IMG1, the pixel clock input to the mapping processing circuit 30 along with the image IMG1 is input to the coordinate counter 10.

The coordinate transform circuit 20 performs coordinate transformation from the input coordinate IXY1 to the output coordinate QXY1. In the second exemplary configuration, the output coordinate QXY1 is a coordinate (x, y) corresponding to a coordinate on the image IMG2. The coordinate transform equation when the polynomial is a second order polynomial is shown in the following equation (3). The following equation (3) corresponds to inverse coordinate transform of the above-equation (1).

[Math. 3]

$$\begin{cases} x = h(x', y') = c1 \times x'^2 + c2 \times y'^2 + c3 \times x'y' + c4 \times x' + c5 \times y' + c6 \\ y = k(x', y') = d1 \times x'^2 + d2 \times y'^2 + d3 \times x'y' + d4 \times x' + d5 \times y' + d6 \end{cases} \quad (3)$$

The coordinate transform circuit 20 performs computation processing of the above-equation (3) based on the coefficient information CF1. In the second exemplary configuration, the coefficient information CF1 is information of coefficients c1 to c6 and d1 to d6 of the above-equation (3). The configuration of the coordinate transform circuit 20 is similar to the first exemplary configuration described in FIG. 3. Note that, in the second exemplary configuration, (x', y') is input to the first computation circuit 21 and the second computation circuit 22 as the input coordinate, the coefficients c1 to c6 are input to the second computation circuit 22, and x is output from the second computation circuit 22 as the output coordinate.

The mapping processing circuit 30 moves the pixel value at the coordinate (x', y') in the image IMG1 to the coordinate (x, y) in the image IMG2. (x', y') is the output coordinate QXY1, and (x, y) is the input coordinate IXY1. The mapping processing circuit 30 includes a memory control circuit 31, a coordinate counter 32, and an image memory 33.

The coordinate counter 32 outputs (xb, yb) as a second count coordinate CXYB1. In the second exemplary configuration, since (xb, yb) designates a coordinate on the image IMG2, the pixel clock used when the mapping processing circuit 30 processes the image IMG2 is input to the coordinate counter 32.

The memory control circuit 31 writes the image IMG1 into the image memory 33 based on the output coordinate QXY1 from the coordinate transform circuit 20, reads out a pixel value from the image memory 33 based on the second count coordinate CXYB1, and outputs the pixel value as a pixel value of the image IMG2.

Specifically, the write address controller 34 decodes (x, y), which is the output coordinate QXY1, into the write address ADWR, and writes the pixel value at (x', y') of the image IMG1 into the image memory 33 at the address ADWR. This operation corresponds to moving the pixel value at (x', y') of the image IMG1 to a coordinate (x, y). That is, the image IMG1 written into the image memory 33 is an image deformed by the distortion correction.

The read address controller 35 reads out and decodes (xb, yb), which is the second count coordinate CXYB1, into the address ADRD, and reads out a pixel value from the address ADRD of the image memory 33. The read address controller 35 outputs the read-out pixel value as a pixel value at (x, y) of the image IMG2. As a result of repeating this operation, the image IMG2 is output from the mapping processing circuit 30.

In the mapping processing described above, the pixel value at (x', y') of the image IMG1 is moved to the pixel value at (x, y) of the image IMG2. That is, the mapping processing circuit 30 functions as the forward warp engine described in FIG. 6.

3. Third Exemplary Configuration

In a third exemplary configuration, the circuit device 100 performs rotation correction on a display image in addition to distortion correction. First, the relationship between the mounting tolerance of the head up display and the rotation correction will be described using FIG. 7. Note that, in FIG. 7, a case where the head up display is installed in a dashboard of an automobile will be described as an example, but the place where the head up display is installed is not limited thereto. Also, although the display unit DSP of the head up display is illustrated as a flat plane in FIG. 7, the display unit DSP is actually a curved screen display.

Figure 7:
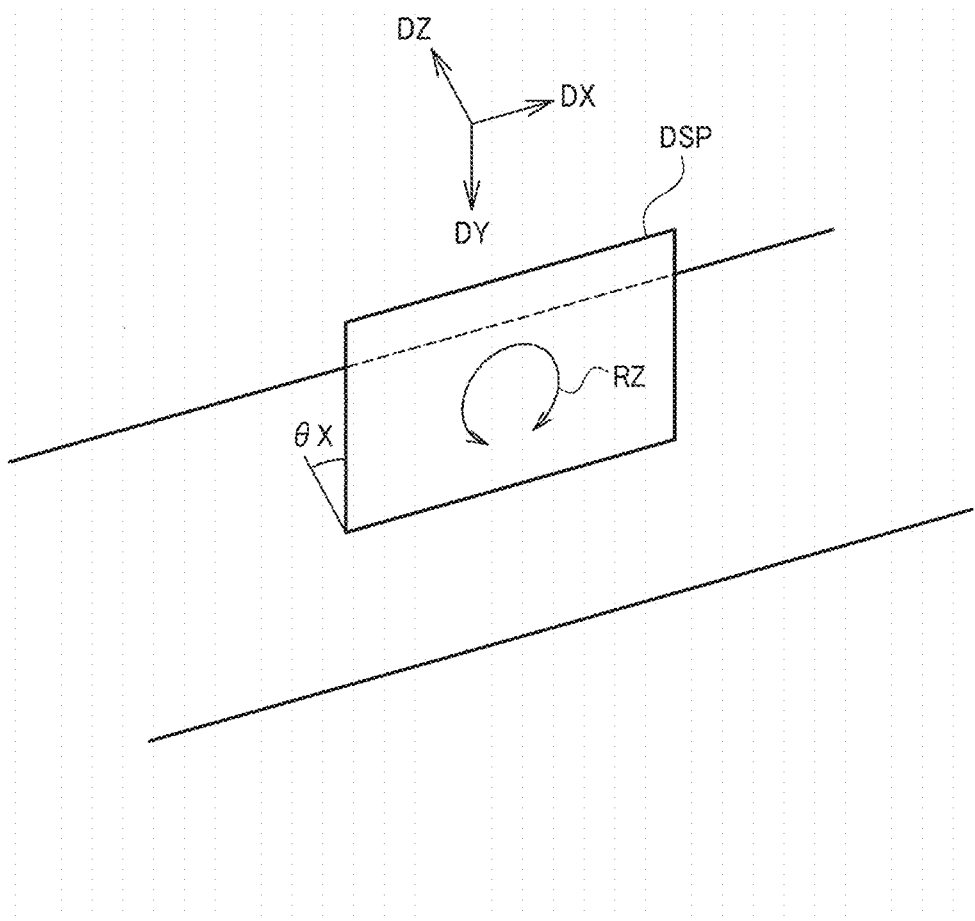
FIG. 7 is a diagram illustrating the relationship between a mounting tolerance and rotation correction in a head up display.

The direction DZ shown in FIG. 7 is a direction orthogonal to the display unit DSP of the head up display. Specifically, the direction DZ is orthogonal to the display unit DSP at some position of the display unit DSP, which has a curved surface. For example, the direction DZ is orthogonal to the display unit DSP at the center of the display unit DSP, for example. The direction DX is a direction orthogonal to the direction DZ, and the direction DY is a direction orthogonal to the direction DX and the direction DZ. The direction DX corresponds to a horizontal direction. That is, when the automobile is in a horizontal orientation, the direction DX is parallel to a horizontal plane. When the head up display is vertically installed on the dashboard of the automobile, the direction DY corresponds to a vertical direction, and the direction DY is perpendicular to the horizontal plane. Note that the direction DY is not limited to the vertical direction, and the direction DY may be inclined relative to the horizontal plane. When the head up display is installed on the dashboard so as to incline at an angle 8X in the depth direction, the direction DY inclines relative to the horizontal plane by the angle 8X.

A rotation RZ indicates rotation of the display unit DSP whose rotation axis is an axis parallel to the direction DZ. Due to tolerance when the head up display is attached to the dashboard, the rotation angle of the rotation RZ variates. It is defined that the rotation angle when the tolerance is zero is zero degrees, the clockwise rotation is positive, and the counterclockwise rotation is negative. When the rotation RZ of the display unit DSP has a positive rotation angle, the display image rotates in a clockwise direction viewed from the user. The circuit device 100 performs processing such that the image rotates in the negative direction, that is, counterclockwise. With this, even if the display unit DSP inclines due to tolerance, an image that is not inclined viewed from the user can be displayed.

Figure 8:
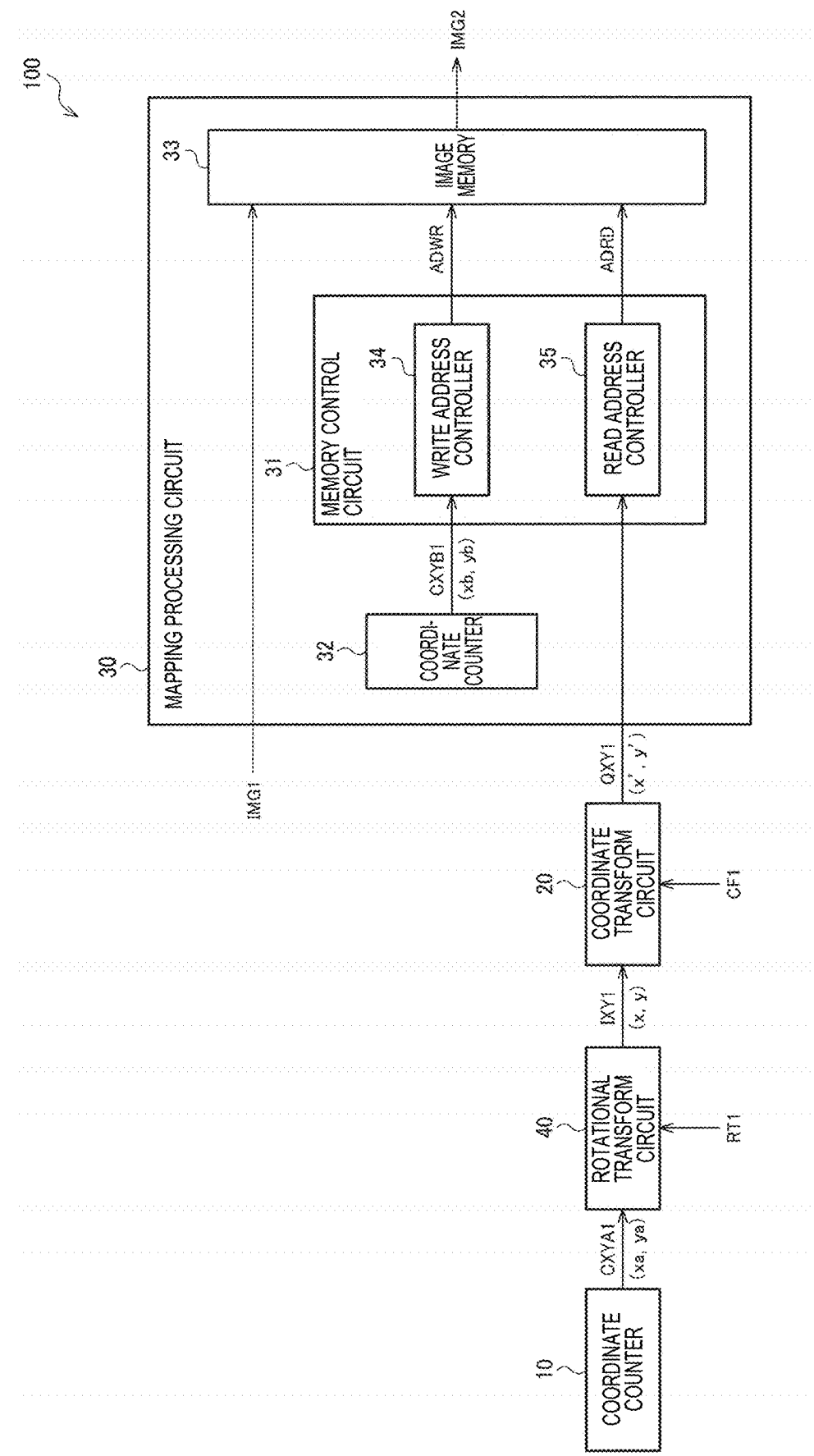
FIG. 8 shows a third exemplary configuration of the circuit device.
Figure 9:
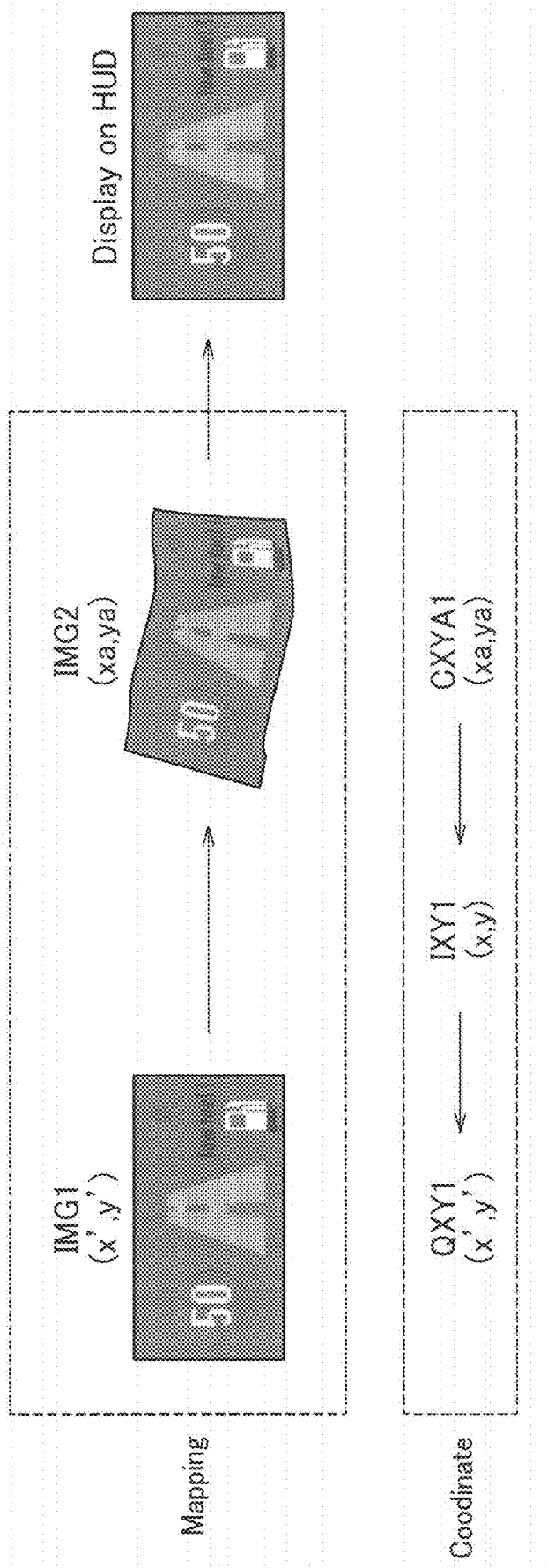
FIG. 9 is a diagram illustrating operations of the circuit device in the third exemplary configuration.

FIG. 8 shows a third exemplary configuration of the circuit device 100. FIG. 9 is a diagram illustrating operations of the circuit device 100 in the third exemplary configuration.

In the third exemplary configuration, a case where the circuit device 100 is an inverse warp engine will be described. As shown in FIG. 9, the circuit device 100 rotationally transforms a coordinate (xa, ya) in an image IMG2, which is an output image, transforms the coordinate (x, y) subjected to the rotational transformation to a coordinate (x', y') in an image IMG1, which is an input image, and performs mapping processing based on the coordinates, and as a result, image rotation and inverse warp are realized.

As shown in FIG. 8, the circuit device 100 includes a coordinate counter 10, a coordinate transform circuit 20, a mapping processing circuit 30, and a rotational transform circuit 40. Note that the description of the constituent elements and operations similar to those of the first exemplary configuration will be omitted as appropriate.

The coordinate counter 10 outputs (xa, ya) as a first count coordinate CXYA1. Because (xa, ya) corresponds to a coordinate on the image IMG2, the pixel clock used when the mapping processing circuit 30 processes the image IMG2 is input to the coordinate counter 10.

The rotational transform circuit 40 performs rotational transformation on the first count coordinate CXYA1, and outputs the coordinate subjected to the rotational transformation to the coordinate transform circuit 20 as the input coordinate IXY1. In the third exemplary configuration, the input coordinate IXY1 is (x, y). As shown in the following equation (4), the rotational transform circuit 40 performs coordinate rotation using affine transformation. θ is a rotation angle.

[Math. 4]

$$\begin{pmatrix} x \\ y \end{pmatrix} = \begin{pmatrix} \cos\theta & -\sin\theta \\ \sin\theta & \cos\theta \end{pmatrix} \begin{pmatrix} xa \\ ya \end{pmatrix} \qquad (4)$$

The rotational transform circuit 40 transforms the first count coordinate CXYA1 to the input coordinate IXY1 using the above-equation (4) based on angle information RT1 indicating the rotation angle θ. For example, the circuit device 100 includes a storage for storing the angle information RT1 and the coefficient information CF1, the angle information RT1 is input to the rotational transform circuit 40 from the storage, and the coefficient information CF1 is input to the coordinate transform circuit 20 from the storage. The storage is a register or a memory. The memory is a semiconductor memory such as a RAM or a nonvolatile memory. The angle information RT1 and the coefficient information CF1 are written into the storage when the circuit device 100 is activated or the head up display is manufactured, for example.

The coordinate transform circuit 20 performs coordinate transformation from the input coordinate IXY1 to the output coordinate QXY1 based on the coefficient information CF1. In the third exemplary configuration, the output coordinate QXY1 is a coordinate (x', y') corresponding to a coordinate on the image IMG1. The coordinate transform equation is similar to that of the first exemplary configuration.

The mapping processing circuit 30 obtains the pixel value at the coordinate (xa, ya) in the image IMG2 from the pixel value at the coordinate (x', y') in the image IMG1. (xa, ya) is the first count coordinate CXYA1, and (x', y') is the output coordinate QXY1. The configuration and operations of the mapping processing circuit 30 are similar to those of the first exemplary configuration.

In the mapping processing in the third exemplary configuration, the pixel value at (xa, ya) of the image IMG2 is acquired from the pixel value at (x', y') of the image IMG1. That is, the mapping processing circuit 30 functions as the inverse warp engine illustrated in FIG. 9. Also, as a result of the rotational transform circuit 40 performing coordinate rotation, the inverse warp including image rotation is performed in the mapping processing.

4. Fourth Exemplary Configuration

Figure 10:
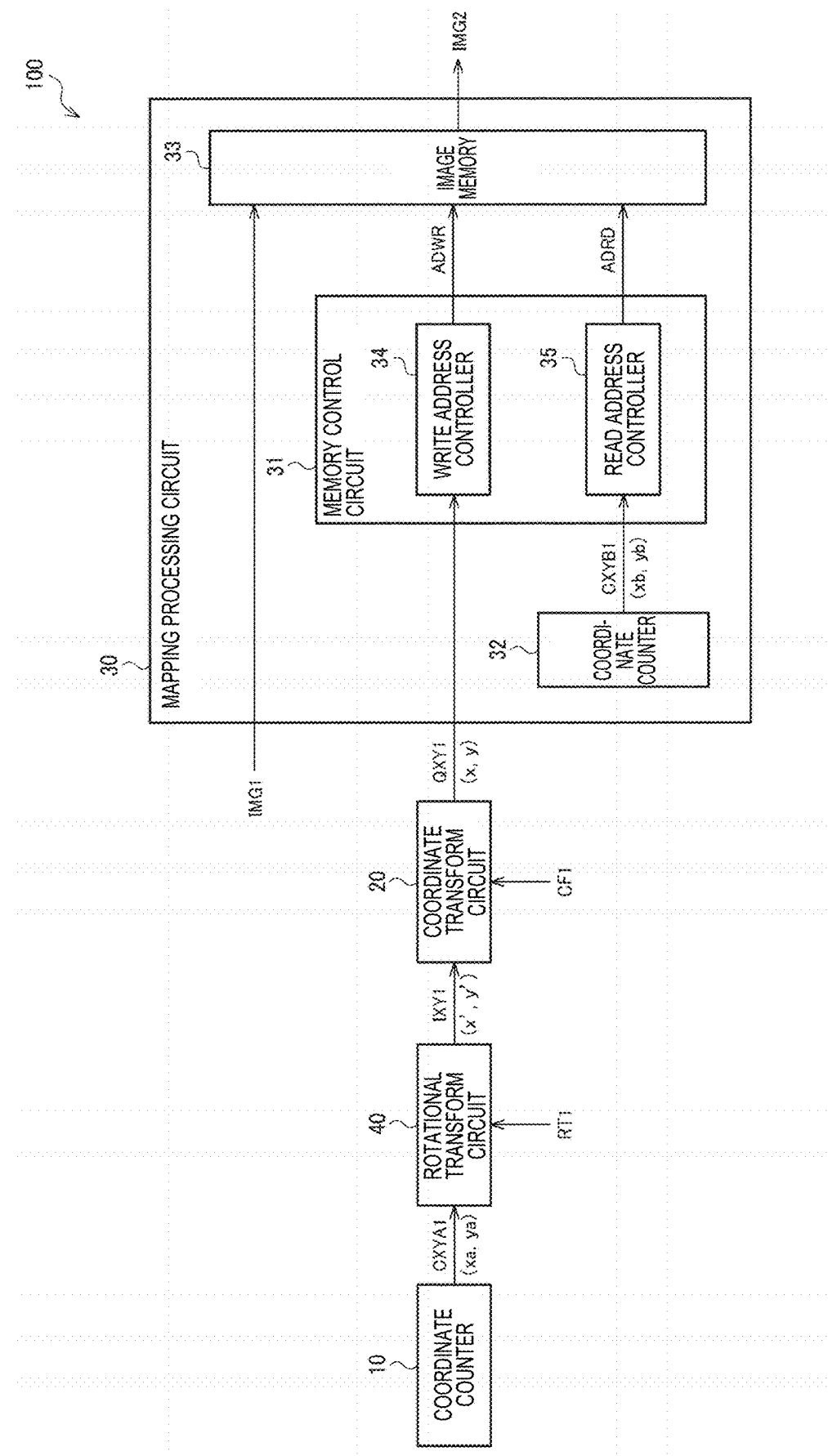
FIG. 10 shows a fourth exemplary configuration of the circuit device.
Figure 11:
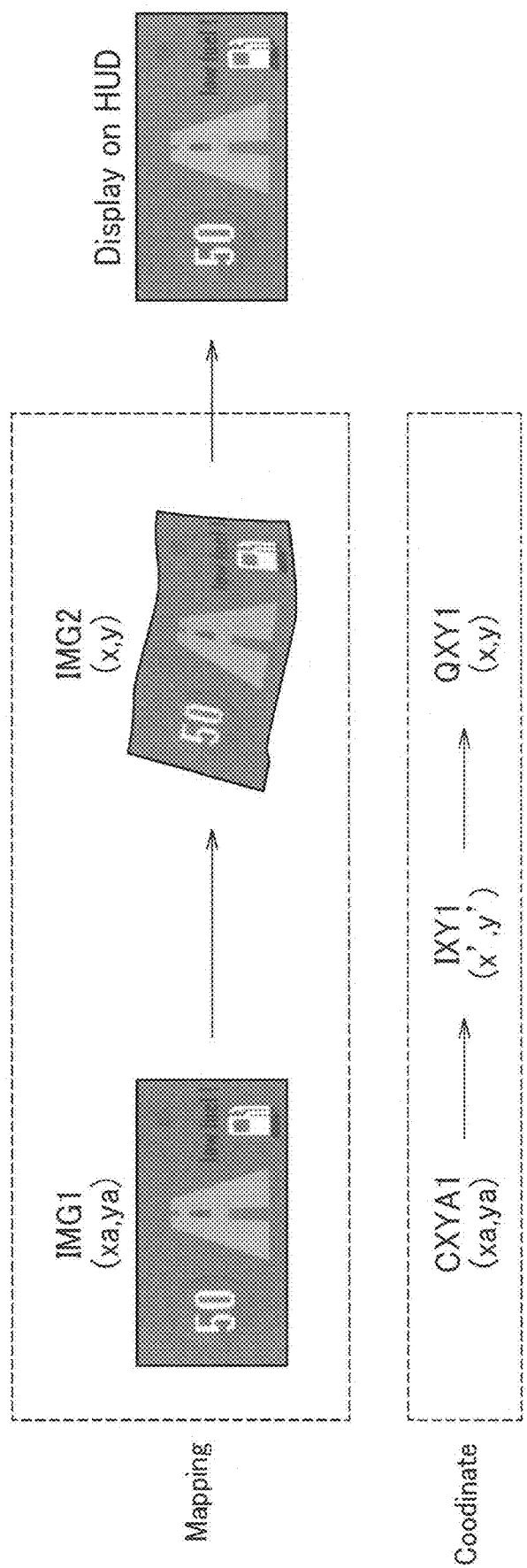
FIG. 11 is a diagram illustrating operations of the circuit device in the fourth exemplary configuration.

FIG. 10 shows a fourth exemplary configuration of the circuit device 100. FIG. 11 is a diagram illustrating operations of the circuit device 100 in the fourth exemplary configuration.

In the fourth exemplary configuration, a case where the circuit device 100 is a forward warp engine will be described. As shown in FIG. 11, the circuit device 100 rotationally transforms a coordinate (xa, ya) in an image IMG1, which is an input image, transforms a coordinate (x', y') subjected to the rotational transformation to a coordinate (x, y) in an image IMG2, which is an output image, and performs mapping processing based on these coordinates, and as a result, image rotation and forward warp are realized.

As shown in FIG. 10, the circuit device 100 includes a coordinate counter 10, a coordinate transform circuit 20, a mapping processing circuit 30, and a rotational transform circuit 40. Note that the description of the constituent elements and operations similar to those of the second and third exemplary configurations will be omitted as appropriate.

The coordinate counter 10 outputs (xa, ya) as a first count coordinate CXYA1. In the fourth exemplary configuration, (xa, ya) corresponds to a coordinate on the image IMG1, and therefore the pixel clock input to the mapping processing circuit 30 along with the image IMG1 is input to the coordinate counter 10.

The rotational transform circuit 40 rotationally transforms the first count coordinate CXYA1, and outputs a coordinate subjected to the rotational transformation to the coordinate transform circuit 20 as the input coordinate IXY1. In the fourth exemplary configuration, the input coordinate IXY1 is (x', y'). As shown in the following equation (5), the rotational transform circuit 40 performs coordinate rotation using affine transformation. $\theta$ is a rotation angle.

[Math. 5]

$$\begin{pmatrix} x' \\ y' \end{pmatrix} = \begin{pmatrix} \cos\theta & -\sin\theta \\ \sin\theta & \cos\theta \end{pmatrix} \begin{pmatrix} xa \\ ya \end{pmatrix} \quad (5)$$

The rotational transform circuit 40 transforms the first count coordinate CXYA1 to the input coordinate IXY1 based on angle information RT1 indicating the rotation angle $\theta$ using the above-equation (5).

The coordinate transform circuit 20 performs coordinate transformation from the input coordinate IXY1 to the output coordinate QXY1 based on coefficient information CF1. In the fourth exemplary configuration, the output coordinate QXY1 is a coordinate (x, y) corresponding to a coordinate on the image IMG2. The coordinate transform equation is similar to that of the second exemplary configuration.

The mapping processing circuit 30 moves the pixel value at a coordinate (xa, ya) in the image IMG1 to a coordinate (x, y) in the image IMG2. (xa, ya) is the first count coordinate CXYA1, and (x, y) is the output coordinate QXY1. The configuration and operations of the mapping processing circuit 30 are similar to those of the second exemplary configuration.

In the mapping processing in the fourth exemplary configuration, the pixel value at (xa, ya) of the image IMG1 is moved to the pixel value at (x, y) of the image IMG2. That is, the mapping processing circuit 30 functions as the forward warp engine described in FIG. 11. Also, as a result of the rotational transform circuit 40 performing coordinate rotation, the forward warp including image rotation is performed in the mapping processing.

5. Fifth Exemplary Configuration

Figure 12:
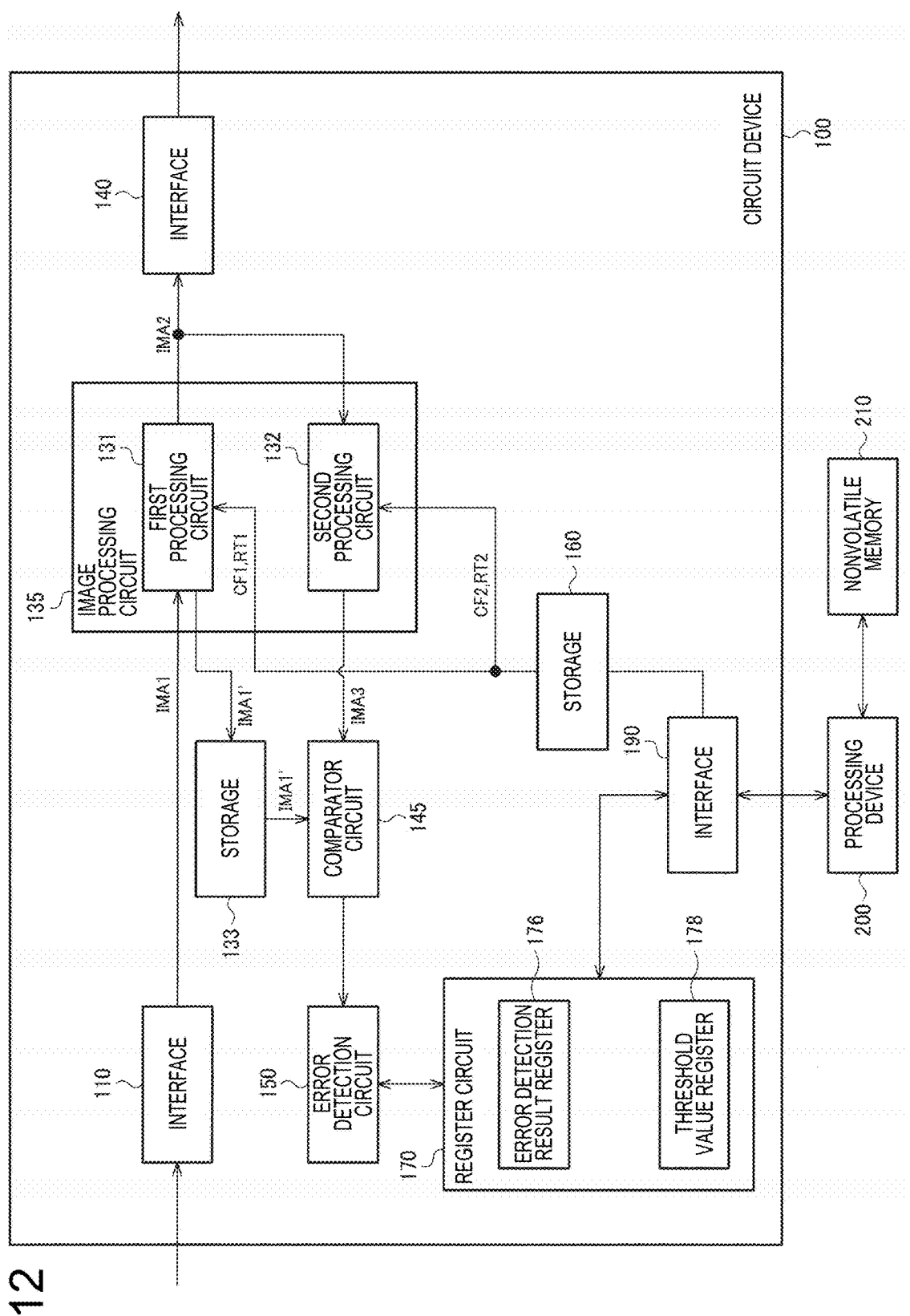
FIG. 12 shows a fifth exemplary configuration of the circuit device.

FIG. 12 shows a fifth exemplary configuration of the circuit device 100. In the fifth exemplary configuration, the circuit device 100 generates an image IMG3 by performing inverse mapping processing on an image IMG2, and detects an error in the image IMG2 by comparing an image IMG1 with an image IMG3.

The circuit device 100 includes an interface 110, a storage 133, an image processing circuit 135, an interface 140, a comparator circuit 145, an error detection circuit 150, a storage 160, a register circuit 170, and an interface 190.

The interface 110 receives image data that is transmitted from a processing device 200 or the like to the circuit device 100, for example. The interface 110 converts the received image data to a format that is used within the circuit device 100, and outputs the converted image data as the image IMA1. For example, the interface 110 is an OpenLDI (Open LVDS Display Interface), and converts a serial signal received with LVDS (Low Voltage Differential Signaling) to an RGB parallel signal. The processing device 200 is an SoC (System on a Chip), an MCU (Micro Control Unit), or a CPU (Central Processing Unit), for example.

The image processing circuit 135 includes a first processing circuit 131 that performs mapping of an image according to the surface shape of a curved screen display of a head up display, and a second processing circuit 132 that performs inverse mapping thereof. The first processing circuit 131 may also be referred to as a first warp engine, and the second processing circuit 132 may also be referred to as a second warp engine. Hereinafter, an example in which the first processing circuit 131 and the second processing circuit 132 perform image rotation along with distortion correction will be described, but the first processing circuit 131 and the second processing circuit 132 may perform only the distortion correction.

Note that the curved screen display is a screen or a display panel in the head up display. The screen is also referred to as a projection target. When the curved screen display is a screen, the head up display includes a projection device that projects an image IMA2 on the screen. The projection device includes a liquid crystal display panel, a display driver that drives the liquid crystal display panel, a light source, and a lens. The display driver causes the liquid crystal display panel to display an image based on the received image data, the light source emits light toward the liquid crystal display panel, and light that has passed through the liquid crystal display panel is projected onto the screen by the lens. The screen is a transparent substance, and also has a reflection surface that reflects light projected thereon. For example, in an on-board head up display, the screen is a transparent screen mounted to the dashboard, or a windshield of an automobile. When a curved screen display is the display panel, the head up display is configured such that the display image in the display panel can be directly viewed by a user, and the head up display displays the image IMA2 in the display panel. The display panel is a transparent display using an organic EL panel, for example, and the transparent display has a curved surface.

The first processing circuit 131 performs first mapping processing using coefficient information CF1 and first rotation processing using angle information RT1 on the image IMA1, and outputs the image IMA2 subjected to the processing. The image IMA1 is a first image, and the image IMA2 is a second image. Also, the first processing circuit 131 extracts an image IMA1' of a region of interest from the image IMA1. The region of interest is also referred to as an ROI. Note that the image IMA1' may be the entire image IMA1. In the following, a case where the image IMA1' is an image of a region of interest extracted from the image IMA1 will be described as an example, and the image IMA' of the region of interest is also referred to as the first image.

The second processing circuit 132 performs second mapping processing using coefficient information CF2 and second rotation processing using angle information RT2 on the image IMA2, and outputs an image IMA3 subjected to the processing. The image IMA3 is a third image. Specifically, the second processing circuit 132 extracts an image of a region of interest from the image IMA2, and performs the second mapping processing and the second rotation processing on the extracted image. The second rotation processing is inverse rotation processing of the first rotation processing. The image IMA3 is an image obtained by performing inverse mapping and inverse rotation on the image of the region of interest that has been extracted from the image IMA2.

The interface 140 outputs the image IMA2 to the outside of the circuit device 100. The outside of the circuit device 100 is the display driver that drives the display panel of the head up display, for example. For example, the interface 140 is an LVDS interface, and converts the RGB parallel signal from the image processing circuit 135 to an LVDS serial signal.

The storage 133 is a first storage. The first processing circuit 131 stores the image IMA1' of the region of interest in the storage 133. The storage 160 is a memory. For example, the memory is a semiconductor memory such as a RAM or a nonvolatile memory. Note that the storage 133 and the storage 160 may be constituted by separated memories, or may be constituted by one memory.

The comparator circuit 145 performs processing for comparing the image IMA1' stored in the storage 133 with the image IMA3, and outputs the comparison result. This comparison result is used to detect an error in the image IMA2. That is, the comparison result is used to verify whether or not the first mapping processing and the first rotation processing have been properly performed by the first processing circuit 131. The comparator circuit 145 obtains an index indicating the similarity between the image IMA1' and the image IMA3. The index is a later-described shape index or visibility index. Alternatively, the comparator circuit 145 may obtain an SSD (Sum of Squared Difference), an SAD (Sum of Absolute Difference), an NCC (Normalized Cross Correlation), or the like as the index.

The error detection circuit 150 detects an error in the second image IMA2 by comparing the index with a threshold value. The threshold value is a threshold value indicating the allowable similarity between the image IMA1' and the image IMA3.

If an error is detected by the error detection circuit 150, the image processing circuit 135 stops outputting the image IMA2 to the interface 140. Alternatively, if an error is detected by the error detection circuit 150, the interface 140 stops outputting the image IMA2. The interface 140 may output the image IMA2 along with error information, and the display driver that has received the error information may perform operations based on the error information. Alternatively, the interface 190 may output the error information to the processing device 200, and the processing device 200 that has received the error information may perform operations based on the error information. The error information is an error determination flag, an index, or the like. The operations based on the error information is stopping display in the head up display, for example.

The interface 190 performs inter-circuit communication between the circuit device 100 and the processing device 200. For example, the interface 190 is a serial communication interface such as an SPI (Serial Peripheral Interface) system or an I2C system. Setting information and control information from the processing device 200 is written into the register circuit 170, for example, and the circuit device 100 performs operations in accordance with the setting information and the control information.

The register circuit 170 is configured to be accessible from the processing device 200 via the interface 190. The register circuit 170 includes an error detection result register 176 and a threshold value register 178.

The error detection result register 176 stores an error detection result output from the error detection circuit 150. The error detection result is an error determination flag indicating whether or not an error is determined in the display image, for example. The processing device 200 can determine whether or not an error has occurred by reading out the error detection result from the error detection result register 176 via the interface 190.

A threshold value is set to the threshold value register 178 from the processing device 200 via the interface 190. The error detection circuit 150 detects an error by comparing the index with the threshold value set in the threshold value register 178.

The storage 160 is a second storage. The storage 160 stores coefficient information CF1 and CF2 and angle information RT1 and RT2. Specifically, the processing device 200 transmits CF1, CF2, RT1, and RT2 to the interface 190, and the storage 160 stores CF1, CF2, RT1, and RT2 that are received by the interface 190. The image processing circuit 135 performs mapping processing and rotation based on CF1, CF2, RT1, and RT2 that are read out from the storage 160. The storage 160 is a memory or a register, for example. For example, the memory is a semiconductor memory such as a RAM or a nonvolatile memory.

Note that the image processing circuit 135, the comparator circuit 145, and the error detection circuit 150 are logic circuits. The image processing circuit 135, the comparator circuit 145, and the error detection circuit 150 may be configured as separate circuits, or may be configured as an integrated circuit designed using an automatic placement and routing method. Also, some of or all of the logic circuits may be realized by a processor such as a DSP (Digital Signal Processor). In this case, a program or instruction set in which functions of the respective circuits are described are stored in a memory, and the functions of the respective circuits are realized by a processor executing the program or the instruction set.

In FIG. 12, the circuit device 100 includes the error detection circuit 150 and the error detection result register 176, but the circuit device 100 need not include the error detection circuit 150 and the error detection result register 176. In this case, the configuration may be such that the interface 190 outputs the index obtained by the comparator circuit 145 to the processing device 200, and the processing device 200 that has received the index performs error detection by comparing the index and the threshold value. The processing device 200 may perform, upon detecting an error, an operation for handling the error such as stopping display of the head up display.

Figure 13:
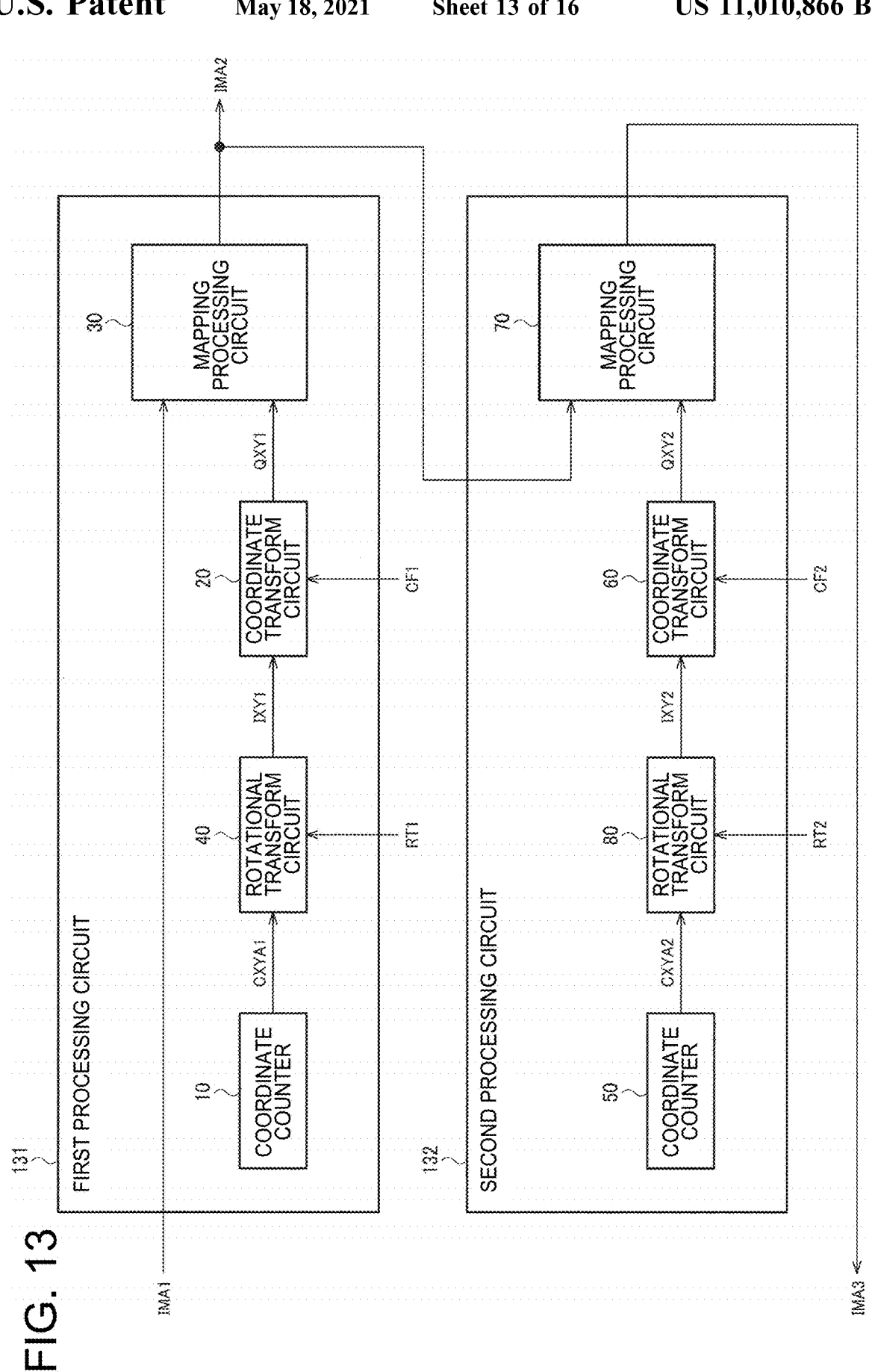
FIG. 13 shows a detailed exemplary configuration of a first processing circuit and a second processing circuit.

FIG. 13 is a detailed exemplary configuration of the first processing circuit 131 and the second processing circuit 132.

The first processing circuit 131 includes a coordinate counter 10, which is a first coordinate counter, a rotational transform circuit 40, which is a first rotational transform circuit, a coordinate transform circuit 20, which is a first coordinate transform circuit, and a mapping processing circuit 30, which is a first mapping processing circuit. The operations of these circuits are the same as those described in the first to fourth exemplary configurations. Note that when the first processing circuit 131 only performs distortion correction, the rotational transform circuit 40 may be omitted.

The second processing circuit 132 includes a coordinate counter 50, which is a second coordinate counter, a rotational transform circuit 80, which is a second rotational transform circuit, a coordinate transform circuit 60, which is a second coordinate transform circuit, and a mapping processing circuit 70, which is a second mapping processing circuit. The coordinate counter 50 outputs a count coordinate CXYA2. The rotational transform circuit 80 rotationally transforms the count coordinate CXYA2 to an input coordinate IXY2 based on the angle information RT2. The coordinate transform circuit 60 coordinate-transforms the input coordinate IXY2 to an output coordinate QXY2 by performing computation processing using a second or more order polynomial based on the coefficient information CF2. The mapping processing circuit 70 performs processing for mapping the image IMA2 to the image IMA3 based on the output coordinates QXY2. The detailed configurations and operations of these circuits are similar to those of the coordinate counter 10, the rotational transform circuit 40, the coordinate transform circuit 20, and the mapping processing circuit 30. Note that when the second processing circuit 132 only performs distortion correction, the rotational transform circuit 80 may be omitted.

Note that the configuration of the second processing circuit 132 is not limited to that shown in FIG. 13. For example, a mapping table in which correspondence between coordinates in the second mapping processing is described may be input to the second processing circuit 132. The second processing circuit 132 may perform the second mapping processing and the second rotation processing based on the mapping table and the angle information RT2.

The image comparison performed by the comparator circuit 145 will be described.

Figure 14:
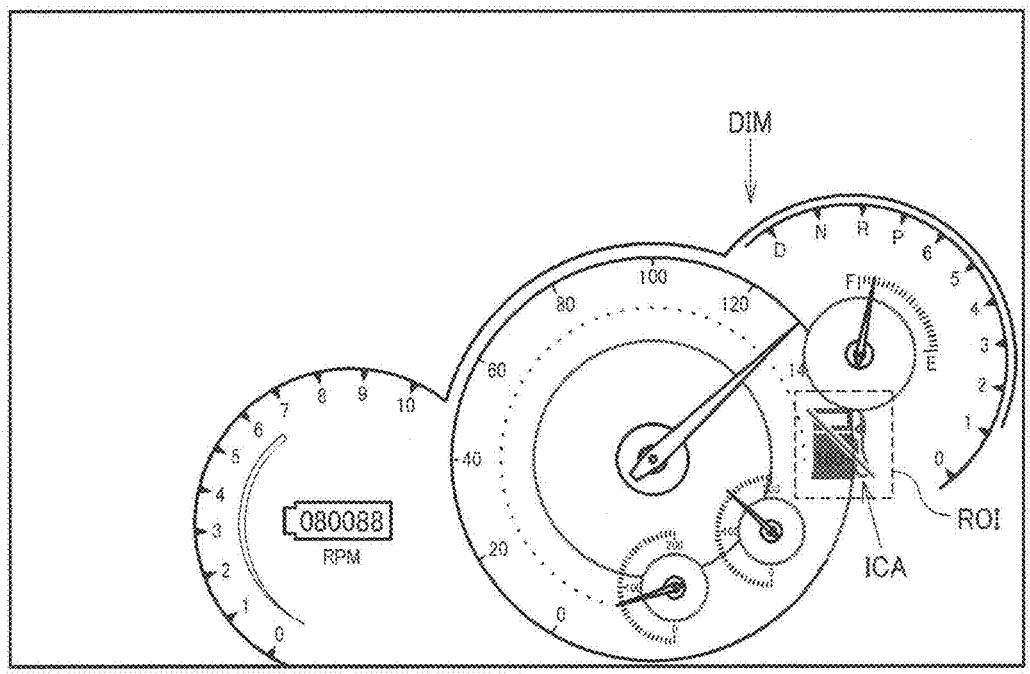
FIG. 14 shows an example of an image to be displayed in the head up display.

FIG. 14 shows an example of the image IMG2 to be displayed in the head up display. In FIG. 14, an icon ICA is superimposed on a meter image DIM. The icon ICA is blended with the meter image DIM at a certain transmittance. In the present embodiment, the circuit device 100 verifies whether or not the icon ICA is properly displayed. In this case, a region including the icon ICA is set as the ROI, as shown by the dotted rectangle in FIG. 14.

Figure 15:
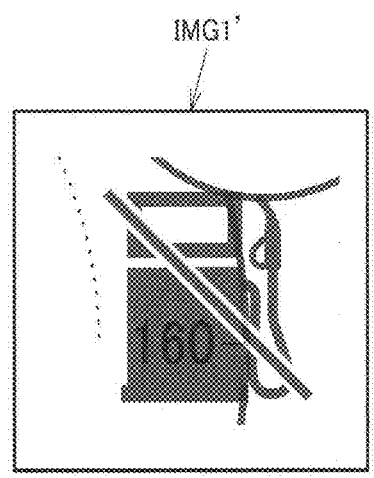
FIG. 15 shows an ROI image extracted from an image before being subjected to mapping processing.
Figure 16:
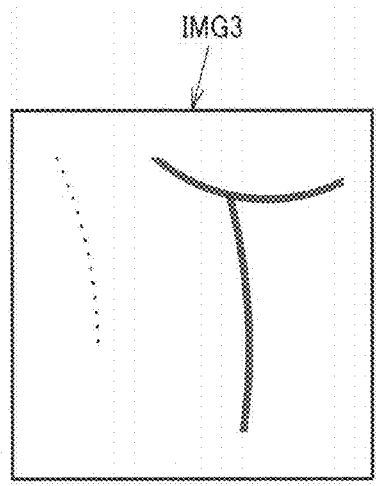
FIG. 16 shows an image obtained by performing inverse mapping processing on an ROI image extracted from an image to be displayed in the head up display.

FIG. 15 shows an ROI image IMG1' extracted from the image IMG1 before being subjected to mapping processing. The icon ICA and the meter image DIM, which is a background image of the icon ICA, are included in the ROI. FIG. 16 shows an image IMG3 obtained by subjecting an ROI image IMG2' extracted from the image IMG2 to inverse mapping processing. FIG. 16 shows an example in which the icon ICA is not properly displayed. In this case, only the background image matches between the image IMG1' and the image IMG3, and the portion of the icon ICA differs. Therefore, the similarity indicated by the index, which is a comparison result, is low. In the image IMG3 as well, if the icon ICA is properly displayed, the similarity increases. The index indicating the similarity can take continuous or step-wise values. The error detection circuit 150 compares the index with a threshold value, and the allowable similarity can be adjusted by adjusting the threshold value.

The comparator circuit 145 obtains a shape index, a visibility index, or both of these indices as the index indicating the similarity between the image IMG1' and the image IMG3. Note that, as described above, the comparator circuit 145 may obtain an SSD, an SAD, or an NCC as the index. Note that whether the index increases as the similarity increases or the index decreases as the similarity increases is determined based on the calculation method of the index. The threshold value is set to each of the shape index and the visibility index.

First, a first calculation method of the shape index will be described. The comparator circuit 145 obtains an inter-image distance between the image IMG1' and the image IMG3 in a color space. The color space is RGB or YCrCb, for example. Specifically, the comparator circuit 145 obtains a square value of the distance, in the color space, between a pixel in the image IMG1' and a pixel in the image IMG3 corresponding to the pixel. The comparator circuit 145 adds up the square values inside the image, and defines the added-up value as the inter-image distance. In the first calculation method, the inter-image distance corresponds to the shape index.

Figure 17:
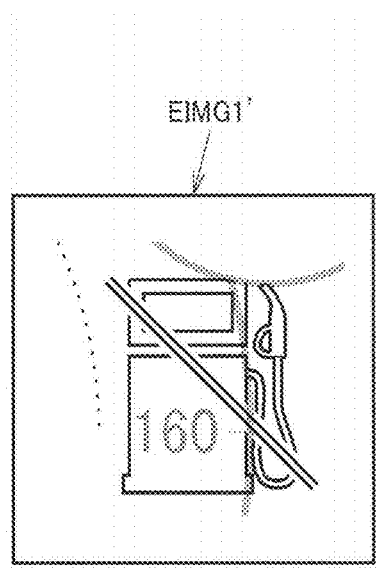
FIG. 17 shows an example of an edge image.

Next, a second calculation method of the shape index will be described. As shown in FIG. 17, the comparator circuit 145 obtains an edge image EIMG1' by extracting edges of the image IMG1'. Also, the comparator circuit 145 obtains an edge image of the image IMG3 by extracting edges of the image IMG3. Hereinafter, the edge image of the image IMG3 is denoted as EIMG3. The comparator circuit 145 compares the edge image EIMG1' with the edge image EIMG3. Specifically, the comparator circuit 145 extracts edges from the image IMA1' and the image IMG3 using a Sobel filter or the like, and obtains a correlation value between the edge image EIMG1' and the edge image EIMG3. In the second calculation method, the correlation value of edge images corresponds to the shape index.

Next, the calculation method of the visibility index will be described. Here, YCrCb is used as the color space, but the color space may be RGB or the like. The comparator circuit 145 obtains a histogram from a Y channel of the image IMG1'. Similarly, the comparator circuit 145 obtains histograms from a Cr channel and a Cb channel of the image IMG1', and obtains histograms from a Y channel, a Cr channel, and a Cb channel of the image IMG3.

The comparator circuit 145 performs cross-correlation computation with respect to the histograms of the image IMG1' and the image IMG3 in the Y channel. The cross-correlation computation is a computation in which a correlation value is obtained by shifting two histograms by a lag, and the correlation values are obtained by changing the lag. If there is a maximum value in the correlation value between two histograms at a certain lag when the lag is changed, there is a peak at the certain lag. It is possible that there are two or more peaks. At the same time, the comparator circuit 145 performs cross-correlation computation on the histograms of the image IMG1' and the image IMG3 in the Cr channel and the Cb channel.

The comparator circuit 145 investigates all the lag values at the peaks with respect to cross-correlation signals of all the channels, and obtains the largest lag value from the lag values. This largest lag value corresponds to the visibility index. When the contrast in color between the icon and the background image is high, because the largest lag value increases, the visibility index indicates the contrast in color between the icon and the background image. It is thought that the higher the color contrast is, the higher the visibility is, and therefore it is determined that the larger the visibility index is, the higher the similarity is.

As a result of using the above-described shape index, the visibility index, or these two indices, the similarity between the ROI image IMG1' and the IMG3 can be determined. When the shape index is used, the similarity is highest when the image IMG1' matches the image IMG3. That is, the similarity can also be referred to as a matching degree. For example, when the icon ICA is displayed in a rotated state, the similarity decreases relative to the case where the icon ICA is not rotated. On the other hand, since the visibility index indicates color contrast, even if the icon ICA is rotated, the similarity does not change much. Therefore, when a case where the icon ICA is rotated or the like is allowed, the visibility index may be used. Also, since the calculation method differs between the shape index and the visibility index, the error detection accuracy can be improved by using both of them.

6. Electronic Apparatus and Mobile Body

Figure 18:
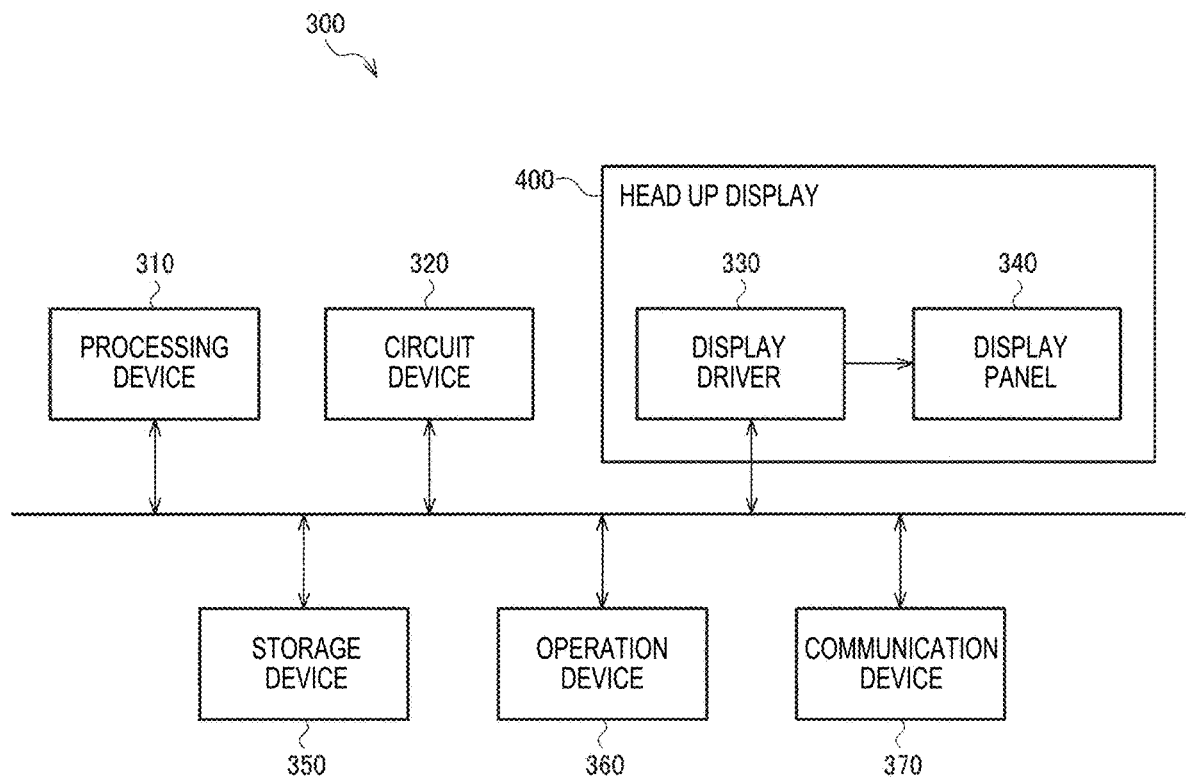
FIG. 18 shows an exemplary configuration of an electronic apparatus.

FIG. 18 shows an exemplary configuration of an electronic apparatus including the circuit device of the present embodiment. The electronic apparatus 300 includes a processing device 310, a circuit device 320, a storage device 350, an operation device 360, a communication device 370, and a head up display 400. The circuit device 320 corresponds to the circuit device 100 of the first to fifth exemplary configurations. The head up display 400 includes a display driver 330 and a display panel 340. The processing device 310 is an MCU, for example. In the exemplary configuration shown in FIG. 18, the circuit device 320 corresponds to a display controller. Note that the circuit device 100 of the present embodiment can also be applied to other circuit devices, as long as the circuit devices generate a display image for a head up display, in addition to the display controller.

The processing device 310 transfers image data stored in the storage device 350 or image data received by the communication device 370 to the circuit device 320. The circuit device 320 performs image processing on the image data, display timing control, generation of image data to be transferred to the display driver, and the like. Also, the circuit device 320 may detect an error in the image data, as described in the fifth exemplary configuration. The display driver 330 causes the display panel 340 to display an image by performing driving based on the image data transferred from the circuit device 320 and display timing control performed by the circuit device 320. The display panel 340 is a liquid crystal display panel or an EL display panel, for example. The storage device 350 is a memory, a hard disk drive, an optical disk drive, or the like. The operation device 360 is a device for a user to operate the electronic apparatus 300, and is a button, a touch panel, or a keyboard, for example. The communication device 370 is a device for performing wired communication or a device for performing wireless communication, for example. The wired communication is a LAN or a USB, for example. The wireless communication is a wireless LAN, wireless near-field communication, or the like.

Various apparatuses such as on-board electronic apparatuses, display terminals for plant facilities and the like, display devices installed in robots, and information processing devices can be envisioned as the electronic apparatus including the circuit device of the present embodiment. The on-board electronic apparatuses are meter panels and the like. The information processing devices are PCs, for example.

Figure 19:
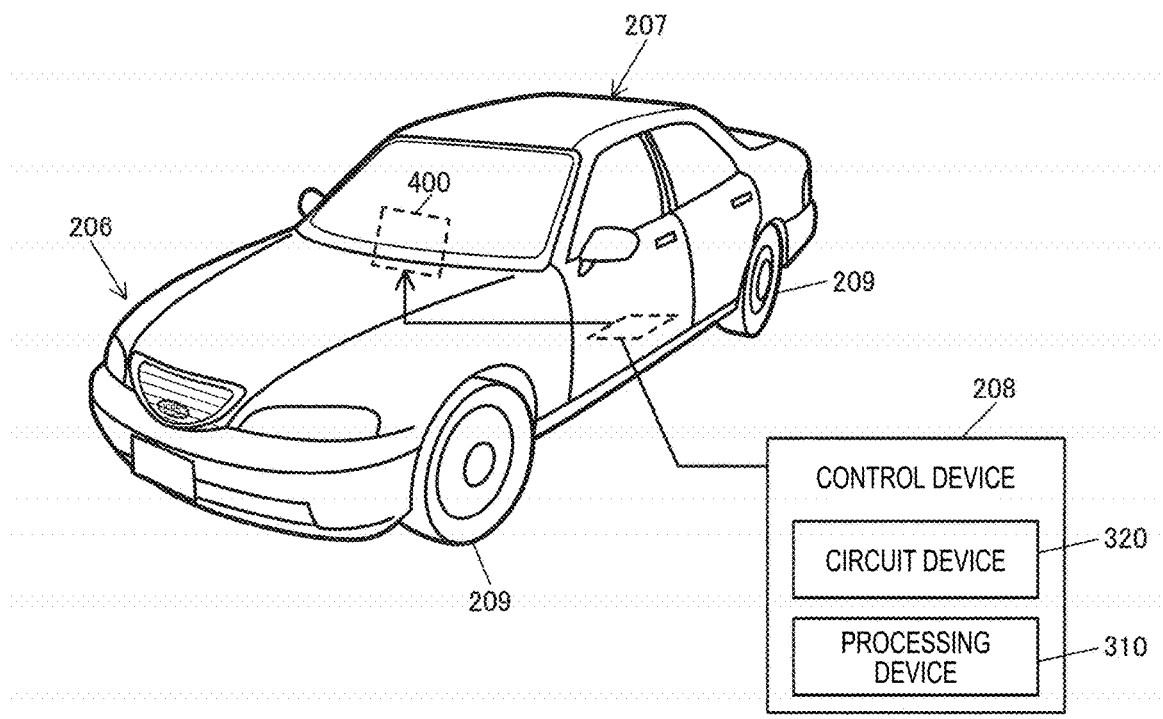
FIG. 19 shows an example of a mobile body.

FIG. 19 shows an example of a mobile body including the circuit device 320 of the present embodiment. The mobile body includes the circuit device 320 of the present embodiment, and a processing device 310 that transmits image data to the circuit device 320. The processing device 310 may perform processing for handling an error based on an error detection result regarding the display image for the head up display from the circuit device 320. The mobile body includes a head up display 400 and a control device 208. The control device 208 is an ECU (Electronic Control Unit), and the circuit device 320 and the processing device 310 are incorporated into the ECU. Note that the circuit device 320 may be incorporated into the head up display 400. The circuit device 320 of the present embodiment can be incorporated into various mobile bodies such as cars, airplanes, motorcycles, bicycles, and ships, for example. The mobile body is an apparatus or a device that includes a drive mechanism such as an engine or a motor, steering mechanisms such as a steering wheel or a rudder, and various electronic apparatuses, for example, and moves on the ground, in the air, and on the sea. FIG. 19 schematically illustrates an automobile 206 serving as a specific example of the mobile body. The head up display 400 includes a transparent screen, and the transparent screen is installed between a driver's seat and a windshield. Alternatively, the head up display may project an image on a windshield using the windshield as the transparent screen. The head up display 400 functions as a meter panel of the automobile 206, for example.

The circuit device of the present embodiment described above includes a coordinate transform circuit and a mapping processing circuit. The coordinate transform circuit performs coordinate transformation from an input coordinate to an output coordinate. The mapping processing circuit generates a second image to be displayed in a display panel for displaying an image in a curved screen display by performing mapping processing, based on the output coordinate, on a first image that is input. The coordinate transform circuit performs the coordinate transformation by performing computation processing using a second or more order polynomial representing the coordinate transformation.

The polynomial is constituted by a combination of multiplications and additions, and does not include complex calculations such as an integral. Therefore, as a result of performing coordinate transformation using a polynomial, computation time can be reduced relative to a case where a calculation including an integral or the like is performed. Also, by using a polynomial, input coordinates have one-to-one correspondence with the output coordinates. One screen's worth image can be formed by the mapping processing circuit performing mapping pixel by pixel using this correspondence relationship. Such successive processing is suitable for real-time processing compared with a case where mapping processing is performed after creating a table or the like.

Also, in the present embodiment, the coordinate transform circuit may receive inputs of coefficient information of the polynomial and the input coordinate, and obtain the output coordinate from the input coordinate by performing the computation processing based on the coefficient information.

In the coordinate transformation using a polynomial, the correspondence between the input coordinates and the output coordinates is determined by the coefficients of the polynomial. That is, as a result of coefficient information corresponding to the shape of a curved screen display being input to the coordinate transform circuit, distortion correction suitable for various curved screen displays can be realized. Also, since the coordinate transform circuit obtains the output coordinate from the input coordinate that has been input, pixel-by-pixel coordinate transformation suitable for real-time processing can be performed, as described above.

Also, in the present embodiment, the coordinate transform circuit may include first to $n^{th}$ term computation circuits and an adder circuit. An $i^{th}$ term computation circuit may compute an $i^{th}$ term of first to $n^{th}$ terms of the polynomial based on the coefficient information. n is an integer of two or more, and i is an integer of one or more and n or less. The adder circuit may output the output coordinate by adding the first to $n^{th}$ terms output from the first to $n^{th}$ term computation circuits.

In this way, since term computation circuits corresponding to the respective terms of the polynomial can be separately provided, the computations of the respective terms are processed in parallel. With this, the coordinate transformation can be processed at high speed.

Also, in the present embodiment, the coordinate transform circuit may include a first computation circuit and a second computation circuit. When the input coordinate is denoted by (x, y), the first computation circuit may obtain $x^2$, $y^2$, and xy. The second computation circuit may obtain the output coordinate based on a computation result of the first computation circuit and the coefficient information.

In this way, the first computation circuit computes terms $x^2$, $y^2$, and xy before being multiplied by coefficients, the second computation circuit multiplies $x^2$, $y^2$, and xy by the respective coefficients, and as a result, respective terms of the polynomial are computed, and the output coordinate can be output by adding the obtained terms. In this way, as a result of using a polynomial, computation of the coordinate transformation can be realized by multiplications and addition.

Also, in the present embodiment, the polynomial may include $a1 \times x^2$, $a2 \times y^2$, $a3 \times xy$, $a4 \times x$, $a5 \times y$, and a6 as first to sixth terms. The coefficient information may include information of a1, a2, a3, a4, a5, and a6 as first to sixth coefficients. The second computation circuit may include a first term computation circuit that multiplies a1 and $x^2$, a second term computation circuit that multiplies a2 and $y^2$, a third term computation circuit that multiplies a3 and xy, a fourth term computation circuit that multiplies a4 and x, a fifth term computation circuit that multiplies a5 and y, and an adder circuit. The adder circuit may output the output coordinate by adding the first to fifth terms that are output by the first to fifth computation circuits and a6, which is a sixth term.

In this way, with respect to the second order terms and first order terms of the polynomial, term computation circuits corresponding to the respective terms can be separately provided. With this, with respect to the second order terms and first order terms of the polynomial, computations of the respective terms are processed in parallel, and as a result, the coordinate transformation can be processed at high speed.

Also, in the present embodiment, the circuit device may include a first coordinate counter. The first coordinate counter may output a first count coordinate, which is a coordinate in units of pixels based on a pixel clock. The coordinate transform circuit may perform the coordinate transformation using the first count coordinate as the input coordinate.

According to the present embodiment, the first coordinate counter outputs the first count coordinate pixel by pixel based on the pixel clock, and the coordinate transform circuit transforms the first count coordinate to the output coordinate. With this, since the output coordinate is output pixel by pixel following the pixel clock, the mapping processing circuit can perform mapping processing pixel by pixel based on the pixel clock. With this, distortion correction suitable for real-time processing can be realized.

Also, in the present embodiment, the input coordinate may be a coordinate corresponding to a coordinate on one of the first image and the second image. The output coordinate may be a coordinate corresponding to a coordinate on the other of the first image and the second image.

When the mapping processing circuit performs inverse warp, the input coordinate corresponds to a coordinate on the second image, and the output coordinate corresponds to a coordinate on the first image. When the mapping processing circuit performs forward warp, the input coordinate corresponds to a coordinate on the first image, and the output coordinate corresponds to a coordinate on the second image. In the computation processing using a polynomial, any of inverse warp and forward warp can be realized by using coefficients corresponding to the inverse warp or coefficients corresponding to the forward warp.

Also, in the present embodiment, the mapping processing circuit may include a second coordinate counter that outputs a second count coordinate, which is a coordinate in units of pixels based on the pixel clock, an image memory that stores the first image, and a memory control circuit that performs access control of the image memory. The memory control circuit may perform the mapping processing by writing the first image into the image memory based on the second count coordinate, and outputting a pixel value read out from the image memory based on the output coordinate as a pixel value at the first count coordinate of the second image. Also, the memory control circuit may perform the mapping processing by writing a pixel value at the first count coordinate of the first image into the image memory as a pixel value at the output coordinate, and outputting a pixel value read out from the image memory based on the second count coordinate as a pixel value at the second count coordinate of the second image.

In the former mapping processing, when the second image is read out from the image memory, the pixel value at the input coordinate of the second image is acquired from the pixel value at the output coordinate of the first image. With this, inverse warp can be realized. In the latter mapping processing, when the first image is written into the image memory, the pixel value at the input coordinate of the first image is moved to the pixel value at the output coordinate. With this, forward warp can be realized.

Also, in the present embodiment, the circuit device may include a rotational transform circuit. The rotational transform circuit performs rotational transformation of a coordinate, and outputs a coordinate after rotation. The coordinate transform circuit may perform the coordinate transformation using the coordinate after rotation as the input coordinate.

In this way, the input coordinate, which is a coordinate after rotation, is transformed to the output coordinate, and mapping processing is performed based on the output coordinate. With this, image rotation corresponding to a mounting error or the like of the curved screen display, and image distortion correction corresponding to image distortion due to the curved screen display can be realized.

Also, in the present embodiment, the circuit device may include a first coordinate counter. The first coordinate counter may output a first count coordinate, which is a coordinate in units of pixels based on a pixel clock. The rotational transform circuit may obtain the coordinate after rotation by performing the rotational transformation on the first count coordinate.

According to the present embodiment, the first coordinate counter outputs the first count coordinate pixel by pixel based on the pixel clock, the rotational transform circuit transforms the first count coordinate to a coordinate after rotation, and the coordinate transform circuit transforms the coordinate after rotation to the output coordinate. With this, since the output coordinate is output pixel by pixel following the pixel clock, the mapping processing circuit can perform mapping processing pixel by pixel based on the pixel clock. With this, rotation correction and distortion correction suitable for real-time processing can be realized.

Also, in the present embodiment, the first count coordinate may also be a coordinate for designating a coordinate on one of the first image and the second image. The output coordinate may also be a coordinate for designating a coordinate on the other of the first image and the second image.

When the mapping processing circuit performs inverse warp, the first count coordinate corresponds to a coordinate on the second image, and the output coordinate corresponds to a coordinate on the first image. When the mapping processing circuit performs forward warp, the first count coordinate corresponds to a coordinate on the first image, and the output coordinate corresponds to a coordinate on the second image. Any of the inverse warp and the forward warp can be realized, in computation processing using a polynomial, by using coefficients corresponding to the inverse warp or coefficients corresponding to the forward warp. Also, since the rotational transform circuit rotationally transforms the first count coordinate, when processing for mapping the first image to the second image is performed, distortion correction and the image rotation are performed at the same time.

Also, in the present embodiment, the mapping processing circuit may include a second coordinate counter that outputs a second count coordinate, which is a coordinate in units of pixels based on the pixel clock, an image memory that stores the first image, and a memory control circuit that performs access control of the image memory. The memory control circuit may perform the mapping processing by writing the first image into the image memory based on the second count coordinate, and outputting a pixel value read out from the image memory based on the output coordinate as a pixel value at the first count coordinate of the second image. Alternatively, the memory control circuit may perform the mapping processing by writing a pixel value at the first count coordinate of the first image to the image memory as a pixel value at the output coordinate, and outputting the pixel value read out from the image memory based on the second count coordinate as the pixel value at the second count coordinate of the second image.

In the former mapping processing, when the second image is read out from the image memory, the pixel value at the first count coordinate of the second image is acquired from the pixel value at the output coordinate of the first image. With this, inverse warp including image rotation and distortion correction can be realized. In the latter mapping processing, when the first image is written into the image memory, the pixel value at the first count coordinate of the first image is moved to the pixel value at the output coordinate. With this, forward warp including image rotation and distortion correction can be realized.

Also, in the present embodiment, the polynomial may be $a1 \times x^2 + a2 \times y^2 + a3 \times xy + a4 \times x + a5 \times y + a6$.

In this way, the coordinate transformation is performed by computation processing using a second order polynomial. The terms of the second order polynomial each include only two times of multiplications at maximum. Therefore, the coordinate transformation using a second order polynomial has a smaller computation load relative to a case where a higher order polynomial is used, and is suitable for real-time processing.

Also, in the present embodiment, the circuit device may include a second mapping processing circuit and a comparator circuit. The second mapping processing circuit may generate a third image by performing second mapping processing, which is inverse mapping processing of the mapping processing, on the second image. The comparator circuit may compare the first image with the third image, and output a result of the comparison as information for detecting an error in the second image.

In this way, the circuit device can verify whether the image subjected to distortion correction in order to be displayed in the head up display is appropriate. Alternatively, when error detection information is output outside of the circuit device, an external device that receives the error detection information can perform the verification. Since the mapping processing circuit maps the first image to the second image, and the second mapping processing circuit inverse-maps the second image to the third image, if the second image is normal, the third image ought to be returned to an image that is the same as the first image. The comparator circuit can output information for detecting an error in the second image by comparing the third image with the first image.

Also, the electronic apparatus of the present embodiment includes any of the circuit devices described above.

Also, the mobile body of the present embodiment includes any of the circuit devices described above.

Note that although an embodiment has been described in detail above, a person skilled in the art will readily appreciate that it is possible to implement numerous variations and modifications that do not depart substantially from the novel aspects and effect of the disclosure. Accordingly, all such variations and modifications are also to be included within the scope of the disclosure. For example, terms that are used within the description or drawings at least once together with broader terms or alternative synonymous terms can be replaced by those other terms at other locations as well within the description or drawings. Also, all combinations of the embodiment and variations are also encompassed in the range of the disclosure. Moreover, the configuration and operation of the circuit device, the head up display, the electronic apparatus, and the mobile body are not limited to those described in the present embodiment, and various modifications are possible.

What is claimed is:

1. A circuit device comprising:
   a coordinate transform circuit configured to perform coordinate transformation from an input coordinate to an output coordinate; and
   a mapping processing circuit configured to generate a second image to be displayed in a display panel for displaying an image in a curved screen display by performing mapping processing, based on the output coordinate, on a first image that is input,
   wherein the coordinate transform circuit performs the coordinate transformation by performing computation processing using a second or more order polynomial representing the coordinate transformation, wherein the coordinate transform circuit is configured to
receive inputs of coefficient information of the polynomial and the input coordinate, and obtain the output coordinate from the input coordinate by performing the computation processing based on the coefficient information, and wherein the coordinate transform circuit includes:

first to $n^{th}$ term computation circuits in which an $i^{th}$ term computation circuit computes an $i^{th}$ term of first to $n^{th}$ terms of the polynomial based on the coefficient information, n being an integer of two or more, and i being an integer of one or more and n or less, and an adder circuit that outputs the output coordinate by adding the first to $n^{th}$ terms output from the first to $n^{th}$ term computation circuits.

2. The circuit device according to claim 1, further comprising:

a first coordinate counter that outputs a first count coordinate, which is a coordinate in units of pixels based on a pixel clock, wherein the coordinate transform circuit is configured to perform the coordinate transformation using the first count coordinate as the input coordinate.

3. The circuit device according to claim 2, wherein the input coordinate is a coordinate corresponding to a coordinate on one of the first image and the second image, and the output coordinate is a coordinate corresponding to a coordinate on the other of the first image and the second image.

4. The circuit device according to claim 2, wherein the mapping processing circuit includes:

a second coordinate counter that outputs a second count coordinate, which is a coordinate in units of pixels based on the pixel clock;

an image memory that stores the first image; and a memory control circuit that performs access control of the image memory, and the memory control circuit is configured to perform the mapping processing by writing the first image into the image memory based on the second count coordinate, and outputting a pixel value read out from the image memory based on the output coordinate as a pixel value at the first count coordinate of the second image, or the mapping processing by writing a pixel value at the first count coordinate of the first image into the image memory as a pixel value at the output coordinate, and outputting a pixel value read out from the image memory based on the second count coordinate as a pixel value at the second count coordinate of the second image.

5. The circuit device according to claim 1, further comprising:

a rotational transform circuit configured to perform rotational transformation of a coordinate, and output a coordinate after rotation, wherein the coordinate transform circuit is configured to perform the coordinate transformation using the coordinate after rotation as the input coordinate.

6. The circuit device according to claim 5, further comprising:

a first coordinate counter that outputs a first count coordinate, which is a coordinate in units of pixels based on a pixel clock, wherein the rotational transform circuit is configured to obtain the coordinate after rotation by performing the rotational transformation on the first count coordinate.

7. The circuit device according to claim 6, wherein the first count coordinate is a coordinate for designating a coordinate on one of the first image and the second image, and the output coordinate is a coordinate for designating a coordinate on the other of the first image and the second image.

8. The circuit device according to claim 1, wherein the polynomial is $a1 \times x^2 + a2 \times y^2 + a3 \times xy + a4 \times x + a5 \times y + a6$.

9. The circuit device according to claim 1, further comprising:

a second mapping processing circuit configured to generate a third image by performing second mapping processing, which is inverse mapping processing of the mapping processing, on the second image; and a comparator circuit configured to compare the first image with the third image, and output a result of the comparison as information for detecting an error in the second image.

10. An electronic apparatus comprising the circuit device according to claim 1.

11. A mobile body comprising the circuit device according to claim 1.

12. A circuit device comprising:

a coordinate transform circuit configured to perform coordinate transformation from an input coordinate to an output coordinate; and a mapping processing circuit configured to generate a second image to be displayed in a display panel for displaying an image in a curved screen display by performing mapping processing, based on the output coordinate, on a first image that is input, wherein the coordinate transform circuit performs the coordinate transformation by performing computation processing using a second or more order polynomial representing the coordinate transformation, wherein the coordinate transform circuit is configured to receive inputs of coefficient information of the polynomial and the input coordinate, and obtain the output coordinate from the input coordinate by performing the computation processing based on the coefficient information, and wherein the coordinate transform circuit includes:

a first computation circuit configured to, when the input coordinate is denoted by (x, y), obtain $x^2$, $y^2$, and xy, and a second computation circuit configured to obtain the output coordinate based on a computation result of the first computation circuit and the coefficient information.

13. The circuit device according to claim 12, wherein the polynomial includes $a1 \times x^2$, $a2 \times y^2$, $a3 \times xy$, $a4 \times x$, $a5 \times y$, and $a6$ as first to sixth terms, the coefficient information may include information of a1, a2, a3, a4, a5, and a6 as first to sixth coefficients, and the second computation circuit includes:

a first term computation circuit that multiplies a1 and $x^2$:

a second term computation circuit that multiplies a2 and $y^2$:

a third term computation circuit that multiplies a3 and xy:

a fourth term computation circuit that multiplies a4 and x:
and a fifth term computation circuit that multiplies a5 and y:
and an adder circuit that outputs the output coordinate by adding the first to fifth terms that are output by the first to fifth computation circuits and a6, which is a sixth term.

14. A circuit device comprising:
a coordinate transform circuit configured to perform coordinate transformation from an input coordinate to an output coordinate;
a mapping processing circuit configured to generate a second image to be displayed in a display panel for displaying an image in a curved screen display by performing mapping processing, based on the output coordinate, on a first image that is input; and
a rotational transform circuit configured to perform rotational transformation of a coordinate, and output a coordinate after rotation,
wherein the coordinate transform circuit performs the coordinate transformation by performing computation processing using a second or more order polynomial representing the coordinate transformation,
wherein the coordinate transform circuit is configured to perform the coordinate transformation using the coordinate after rotation as the input coordinate,
wherein the first count coordinate is a coordinate for designating a coordinate on one of the first image and the second image, and
the output coordinate is a coordinate for designating a coordinate on the other of the first image and the second image,
wherein the mapping processing circuit includes:
a second coordinate counter that outputs a second count coordinate, which is a coordinate in units of pixels based on the pixel clock:
an image memory that stores the first image; and
a memory control circuit that performs access control of the image memory,
and the memory control circuit is configured to perform the mapping processing by writing the first image into the image memory based on the second count coordinate, and outputting a pixel value read out from the image memory based on the output coordinate as a pixel value at the first count coordinate of the second image, or
the mapping processing by writing a pixel value at the first count coordinate of the first image to the image memory as the pixel value at the output coordinate, and outputting a pixel value read out from the image memory based on the second count coordinate as a pixel value at the second count coordinate of the second image.

* * * * *